(12) United States Patent
Ooi et al.

(10) Patent No.: US 12,184,329 B2
(45) Date of Patent: Dec. 31, 2024

(54) WAVELENGTH-DIVISION MULTIPLEXING VISIBLE-LIGHT COMMUNICATION AND LIGHTING DEVICE AND METHOD

(71) Applicant: KING ABDULLAH UNIVERSITY OF SCIENCE AND TECHNOLOGY, Thuwal (SA)

(72) Inventors: Boon S. Ooi, Thuwal (SA); Omar Alkhazragi, Thuwal (SA); Tien Khee Ng, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 140 days.

(21) Appl. No.: 17/792,280

(22) PCT Filed: Jan. 6, 2021

(86) PCT No.: PCT/IB2021/050074
§ 371 (c)(1),
(2) Date: Jul. 12, 2022

(87) PCT Pub. No.: WO2021/144665
PCT Pub. Date: Jul. 22, 2021

(65) Prior Publication Data
US 2023/0047142 A1    Feb. 16, 2023

Related U.S. Application Data

(60) Provisional application No. 62/960,316, filed on Jan. 13, 2020.

(51) Int. Cl.
*H04B 10/116* (2013.01)
*H04B 10/2519* (2013.01)
*H04B 10/61* (2013.01)

(52) U.S. Cl.
CPC ....... *H04B 10/116* (2013.01); *H04B 10/2519* (2013.01); *H04B 10/614* (2013.01)

(58) Field of Classification Search
CPC . H04B 10/116; H04B 10/2519; H04B 10/614
(Continued)

(56) References Cited

U.S. PATENT DOCUMENTS

| 5,324,964 A * | 6/1994 | Ackley | H01L 33/0045 |
| | | | 372/45.01 |
| 6,819,701 B2 * | 11/2004 | Henrichs | H01L 33/20 |
| | | | 257/E33.068 |

(Continued)

OTHER PUBLICATIONS

International Search Report in corresponding/related International Application No. PCT/IB2021/050074, date of mailing Apr. 15, 2021.

(Continued)

*Primary Examiner* — Abbas H Alagheband
(74) *Attorney, Agent, or Firm* — PATENT PORTFOLIO BUILDERS PLLC

(57) ABSTRACT

A visible-light communication and illumination array includes a substrate and plural surface-emitting superluminescent diodes, SLDs, distributed across the substrate. A first set of SLDs of the plural SLDs generates a first light beam having substantially a first wavelength, a second set of SLDs of the plural SLDs generates a second light beam having substantially a second wavelength, and a third set of SLDs of the plural SLDs generates a third light beam having substantially a third wavelength. The array further includes a controller configured to encode at least one of the first light beam, the second light beam and the third light beam to transmit information. A combination of the first light beam, the second light beam and the third light beam produces white light.

20 Claims, 18 Drawing Sheets

(58) Field of Classification Search
USPC .......................................................... 398/58
See application file for complete search history.

(56) References Cited

U.S. PATENT DOCUMENTS

| | | | |
|---|---|---|---|
| 2008/0186503 A1* | 8/2008 | Kiesel | G01N 21/031 |
| | | | 356/454 |
| 2014/0159061 A1* | 6/2014 | Tomoda | H01L 23/60 |
| | | | 257/79 |
| 2017/0227839 A1* | 8/2017 | Maaskant | H01S 5/183 |
| 2017/0237234 A1* | 8/2017 | Han | H01L 33/32 |
| | | | 372/45.012 |
| 2019/0097722 A1* | 3/2019 | McLaurin | H01S 5/34333 |
| 2021/0330184 A1* | 10/2021 | Frisken | A61B 5/0075 |
| 2023/0163569 A1* | 5/2023 | Lee | H01S 5/18347 |
| | | | 372/44.01 |
| 2023/0261444 A1* | 8/2023 | Rossetti | H01S 5/0422 |
| | | | 372/50.1 |

OTHER PUBLICATIONS

Shen, C., et al., "Semipolar InGaN-Based Superluminescent Diodes for Solid-State Lighting and Visible Light Communications," Proceedings of SPIE 10104, Gallium Nitride Materials and Devices XII, Feb. 16, 2017, vol. 10104, pp. 101041U-1-101041U-10, SPIE.
Written Opinion of the International Searching Authority in corresponding/related International Application No. PCT/IB2021/050074, date of mailing Apr. 15, 2021.

* cited by examiner

WAVELENGTH-DIVISION MULTIPLEXING VISIBLE-LIGHT COMMUNICATION AND LIGHTING DEVICE AND METHOD

CROSS-REFERENCE TO RELATED APPLICATIONS

This application is a U.S. National Stage Application of International Application No. PCT/IB2021/050074, filed on Jan. 6, 2021, which claims priority to U.S. Provisional Patent Application No. 62/960,316, filed on Jan. 13, 2020, entitled "CLOSELY SPACED WAVELENGTH-DIVISION MULTIPLEXING (WDM) VISIBLE-LIGHT COMMUNICATION AND LIGHTING APPARATUS USING SURFACE-EMITTING SUPERLUMINESCENT DIODE ARRAY," the disclosures of which are incorporated herein by reference in their entirety.

BACKGROUND

Technical Field

Embodiments of the subject matter disclosed herein generally relate to a closely spaced wavelength-division multiplexing (WDM) visible-light communication apparatus that incorporates a white-lighting function, and more particularly, to an array of vertical-cavity, surface-emitting bluelight superluminescent diodes (SLDs) and high-speed combinatory phosphors for implementing the WDM data transmission scheme.

Discussion of the Background

The use of the optical region of the electromagnetic spectrum in wireless communication opens a window of wide, unlicensed, bandwidth, which can work hand-in-hand with current radio frequency (RF) technologies in meeting the demand for high-speed wireless communication. This demand is rapidly increasing due to the increased interconnectedness of people around the globe, through internet networks. Moreover, devices communicating together through the internet of things (IoT) are also increasing in number and are expected to require ultrahigh speeds in various applications such as smart homes, vehicle-to-vehicle communication, and underwater sensing and exploration.

Semiconductor optoelectronic light sources have shown excellent performance in optical communication applications due to their characteristically rapid switching capabilities, which is required for high-speed communication. For example, InGaAsP laser diodes (LDs) emitting infrared (IR) light (at a wavelength of 1300 or 1550 nm) through optical fibers are the backbone of the current telecommunication networks due to the superior performance of optical transmission over electrical transmission. Similarly, the use of optoelectronic light sources emitting IR, visible, or ultraviolet (UV) light in free space communication is expected to revolutionize the wireless communication field.

Though IR and near-IR light is used in a variety of optical communication applications, such as in fiber-optics and in free-space optics (FSO), some applications specifically require visible light, instead of the IR or near-IR light. These applications include simultaneous lighting a chamber and providing communication channels within that chamber using only white light, in which the IR-based FSO cannot work. Such an example is a waiting room in a medical office. The light provided by the various lighting devices in the waiting room is selected to be in the white range, and an additional device (usually a router) is broadcasting information in a wireless manner, using a part of the electromagnetic wave spectrum that is not white. It is desired to be able to integrate the communication functionality into the white light providing appliance, to reduce the number of appliances needed in that waiting room. Thus, if the white light providing appliance can also support white light based communication, that goal is achieved.

Another application is communicating in underwater environments, in which the attenuation of the IR light is too high for it to carry signals for practical distances. Therefore, underwater optical wireless communication is mainly based on blue and green light, which can be transmitted for relatively long distances with significantly higher speeds than the traditional techniques using acoustic technology. In other applications, the use of the UV light is preferred, such as in non-line-of-sight OWC.

A problem facing the goal of integrating into a single device the white light illumination function with the wireless communication function is the type of devices that support each of these functions. Compositionally tunable InGaN semiconductor light sources can generate light at different wavelengths in the UV-visible band of the spectrum, depending on their composition of indium, thereby allowing for the implementation of the applications mentioned above. While LDs generate light by stimulated emission, photons from light-emitting diodes (LEDs) are emitted spontaneously, when pumped electrically or optically. Unlike stimulated emission, spontaneously emitted light is incoherent, non-directional, and covers a wide band of wavelengths. Moreover, LEDs produce less optical power when compared to LDs. On the other hand, LEDs are more suitable for lighting and displays due to their speckle-free light. Thus, neither the LDs nor the LEDs are capable of simultaneously generating (1) high visual quality (speckle-free) white light for illumination purposes and (2) a white light based high-speed communication channel.

Superluminescent diodes (SLDs) operate in a regime in between spontaneous emission and stimulated emission, which is dubbed amplified spontaneous emission (ASE). They produce light that is less coherent when compared to the LDs, which makes the light produced homogeneous, i.e., speckle-free, while at the same time providing higher power compared to the LEDs, with more directionality and a narrower optical spectrum. Displays made up of SLDs are expected to outperform LED displays due to the better lighting quality and higher power efficiency, which would allow for higher color contrast. Moreover, the narrow spectrum of the SLD light makes it suitable for wavelength-division multiplexing (WDM), which adds a degree of freedom in establishing independent communication channels with minimal interference.

In this respect, FIGS. 1A and 1B illustrate the structure of an SLD 100 and an LD 150, respectively. It is noted that both devices have almost the same structure. More specifically, in the both devices, the active layer (light emission layer) 102 is sandwiched between the p- and n-type clad layers (double heterostructure) 104 and 106, and these structures are formed on an n-type substrate 108. A voltage V is applied across the p-n junction from corresponding electrodes 110 and 112. The difference between the two structures is whether the emitted light is reflected at the end surface of the active layer 102. While the SLD 100 has the end of the active layer 102 coated with an AR-coat 122 to prevent a reflected light, both end surfaces of the active layer 102 in the LD device 150 are cleaved 126 to form a Fabry-Perot resonator. Thus, the generated light 120 from the SLD device 100 is different in intensity from the generated light 124 from the LD device 150.

Traditional SLDs emit light laterally, parallel to the substrate on which they were fabricated, as shown in FIG. 1A. These designs limit the fabrication of large arrays of devices and does not allow for on-wafer testing. To form an array that can be used in a display or as a transmitter in a communication link with multiple channels, it is necessary to design SLDs that emit light through their surface, perpendicular to the substrate. Due to the small thickness of the active region of such a design, reflecting the light multiple times back into the active region of the device is required to achieve ASE by increasing the interaction of the emitted photons with the electrons in the gain medium. This reflection can be achieved using two layers of distributed Bragg reflectors (DBRs) sandwiching the active region. In a vertical-cavity surface-emitting laser (VCSEL) or a horizontal-cavity Fabry-Perot laser, the reflectivity of the mirror stacks is chosen to be nearly 100% to achieve lasing action. On the contrary, the reflectivity of the DBRs of a superluminescent device is chosen to be less than 100% to avoid lasing action.

The mirrors or DBRs consist of alternating layers of materials having different refractive indices. Each layer reflects part of the light causing constructive interference for light waves of wavelengths around four times the optical thickness of these layers. Therefore, DBRs forming the vertical cavity in the SLD need to be carefully designed to match the wavelength of the generated light. For example, one of the DBRs is designed to have a high reflectivity while the other is designed to have a lower reflectivity to allow light to escape through the surface.

The work described in [1], entitled "Superluminescent surface light emitting device," which is incorporated herein in its entirety by reference, teaches a method of fabricating a surface-emitting SLD operating in the IR regime. The design in [1] is, however, not suitable for the ASE of UV/visible light due to the materials used in making the DBRs, which consist of silicon and silicon nitride. The silicon's absorbance of the visible light is high and would make it unsuitable for visible-light sources. The limitation in the wavelength emission in [1] to only IR light prevents its application to visible-light communication (VLC), display manufacturing, and solid-state lighting.

Another design, which is presented in [2] and is entitled "A Superluminescent Light Emitting Diode (SLED) Device," the entire content of which is enclosed herein in its entirety, utilizes a horizontal waveguiding device along with a total internal reflection method to achieve surface emission. The phosphor used in this device produces white light for a projector applications and it is not suitable for high-speed visible-light communication due to the long photon decay time of the phosphor.

In the work presented in [3], entitled "Super-luminescent folded cavity light emitting diode," the entire content of which is included herein by reference, a folded cavity is used in the SLD structure. However, neither of the aforementioned structures explores the use of SLD arrays in visible-light communication, nor have the possibility of being implemented for a closely spaced WDM application.

Thus, there is a need for a new system that is capable of simultaneously delivering both illumination light and a communication supported by the illumination light, so that closely spaced WDM applications can be implemented.

BRIEF SUMMARY OF THE INVENTION

According to an embodiment, there is a visible-light communication and illumination array that includes a substrate and plural surface-emitting superluminescent diodes, SLDs, distributed across the substrate. A first set of SLDs of the plural SLDs generates a first light beam having substantially a first wavelength, a second set of SLDs of the plural SLDs generates a second light beam having substantially a second wavelength, and a third set of SLDs of the plural SLDs generates a third light beam having substantially a third wavelength. The array also includes a controller configured to encode at least one of the first light beam, the second light beam and the third light beam to transmit information. A combination of the first light beam, the second light beam and the third light beam produces white light.

According to another embodiment, there is a surface-emitting superluminescent diode, SLD, configured to generate a blue light. The diode includes an active layer including at least one pair of quantum wells, two separate confinement heterostructure (SCH) layers sandwiching the active layer, a top distributed Bragg reflector formed on one of the two SCH layers, and a bottom distributed Bragg reflector formed on another one of the two SCH layers. The active layer has a lateral current confinement by having a length L smaller than a length of each of the two SCH layers.

According to yet another embodiment, there is a method for obtaining visible-light communication and illumination. The method includes receiving information from an external server, generating white light with a visible-light communication and illumination array, where the visible-light communication and illumination array includes plural surface-emitting superluminescent diodes, SLDs, distributed across a substrate, wherein a first set of SLDs of the plural SLDs generates a first light beam having substantially a first wavelength, a second set of SLDs of the plural SLDs generates a second light beam having substantially a second wavelength, and a third set of SLDs of the plural SLDs generates a third light beam having substantially a third wavelength, encoding at least one of the first to third light beams, with a controller, to transmit the information, and broadcasting the information simultaneously with illuminating with the white light. A combination of the first light beam, the second light beam, and the third light beam produces the white light.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1A:
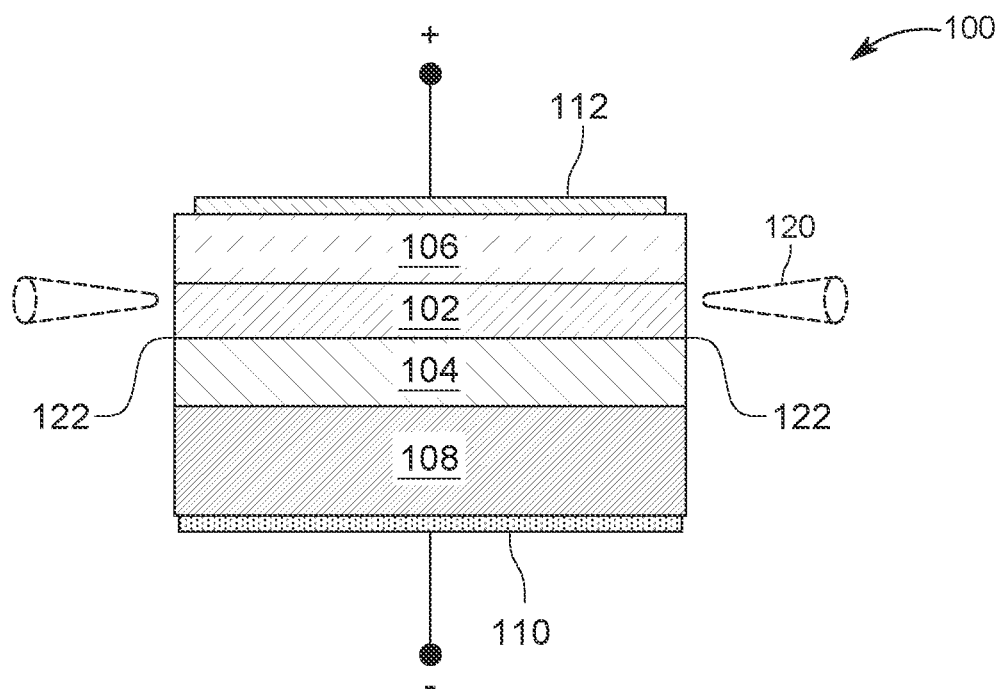
FIG. 1A is a schematic diagram of an SLD device having side light emission.
Figure 1B:
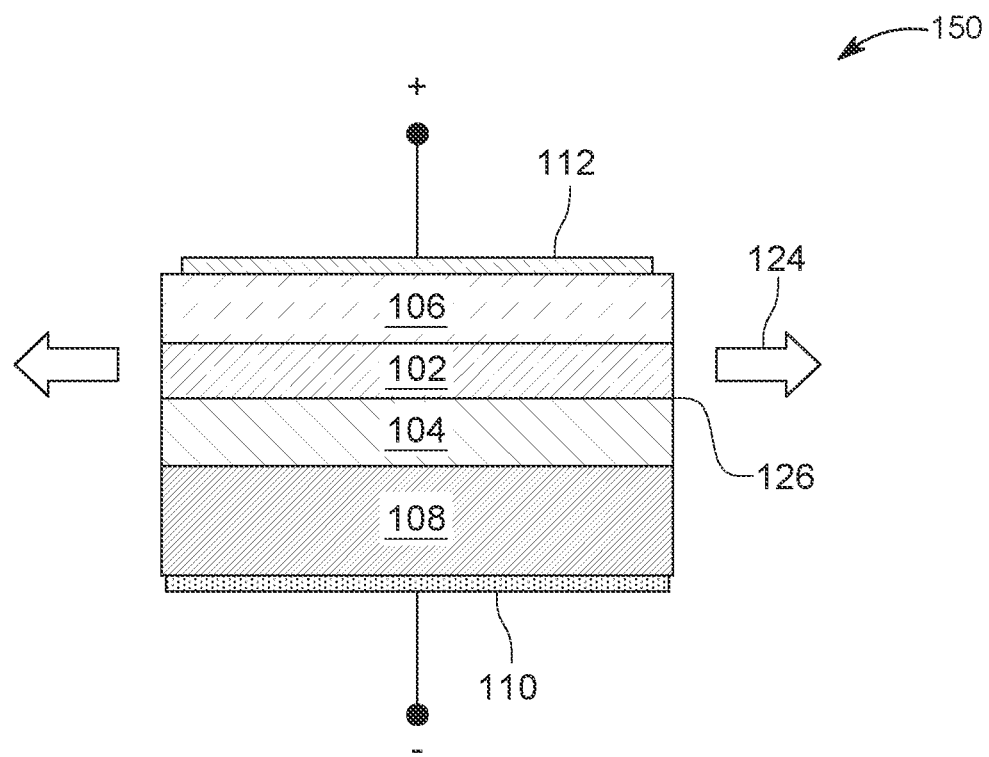
FIG. 1B is a schematic diagram of a laser diode.

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to plural SLDs formed on a same substrate for achieving closely spaced WDM applications. However, the embodiments to be discussed next are not limited to SLDs provided on the same substrate, or to achieving closely spaced WDM applications, but they may be applied to plural SLDs that are located on different substrates and/or for other types of light modulation.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, an array of single-color (blue-light) SLDs, which is advantageous for ease of manufacturability and scalability, is used to make an illumination and communication appliance, as compared to integrating multi-color SLD devices to form an array by pick-and-place technique. Closely spaced WDM in this embodiment refers to the parallel transmission of multiple wavelengths in the visible color regime, which is achieved through the use of the high-speed combinatory phosphors that are coated on the different areas of the SLD array, to convert the blue light into separate wavelengths for transmitting data without interference. SLDs are optoelectronic devices operating in the amplified spontaneous emission (ASE) regime, which offer high-optical power and directionality compared to the light-emitting diodes, while having better viewing comfort (speckle-free radiation) compared to the laser diodes. The surface-emitting design of the SLDs makes the formation of a high-density SLD array possible. The vertical cavity SLD also simplifies the fabrication of high-resolution SLD displays. An array of SLDs can be combined with a chip of complementary metal-oxide-semiconductor (CMOS) integrated circuits (ICs) that can control the SLD array.

The device (e.g., lighting appliance) to be discussed next is configured to achieve ultrahigh speed visible-light communication using a blue-light surface-emitting SLD array integrated with high-speed compositionally tunable phosphor (WDM-phosphor henceforth). In one embodiment, the tunable phosphor includes a halide-perovskite material. Other materials may be used. The SLD array may be used for implementing an on-chip, closely spaced wavelength-division multiplexing process. The device can be integrated with external optics to implement space division multiplexing (SDM). The obtained system generates white lighting due to the possibility of forming multiple colors using the blue SLD array and a combination of phosphors. Using the single-color (blue-light) SLD array is advantageous for the ease of manufacturability and scalability. Closely spaced WDM or color tuning is achieved through the compositionally tunable phosphors individually coated on the surface of the SLD array.

Each SLD device used in the device noted above may be configured to implement a current confinement method by etching the side wall of the active region using photoelectroless chemical etching, followed by subsequent side wall passivation using a polymer layer. Further, each SLD device may implement a high reflectivity porous DBR based on amorphous silicon converted into porous $SiO_2$ as a low refractive-index layer, and a high refractive-index layer, such as $Si_3N_4$, thus forming a higher reflectivity DBR. The porosity of the $SiO_2$ may be induced by photoelectroless chemical etching of the amorphous silicon and the subsequent conversion to $SiO_2$ may be achieved by thermal annealing, or by growing directly porous $SiO_2$ using plasma-enhanced chemical vapor deposition.

As compared to the existing dielectric DBRs comprising $SiO_2/Si_3N_4$, the novel SLD device reduces the number of required dielectric pairs to achieve the same reflectivity. Furthermore, as compared to the porous GaN/GaN DBRs, which were used in a VCSEL device [4], having the title "A method for GaN vertical microcavity surface emitting laser (vcsel)", the entire content of which is incorporated herein by reference, the novel SLD device offers further etch selectivity during photoelectroless chemical etching as different light wavelengths can be used to etch the various components, GaN (<365-nm light), InGaN (370-520-nm light), or forming porous silicon layer (>500-nm light), which can be converted into porous $SiO_2$ using thermal oxidation.

As compared to other existing devices that implement a WDM scheme using typical red-green-blue light-emitting devices with wide wavelength separation in between the different colors due to the limited availability, the novel system discussed herein achieves closely spaced WDM in visible-light communication for beyond 10 to 100 Gbit/s of data transmission while capable of producing a continuous spectrum of white light. The elements of this novel system are now discussed in more detail with regard to the figures.

Figure 2:
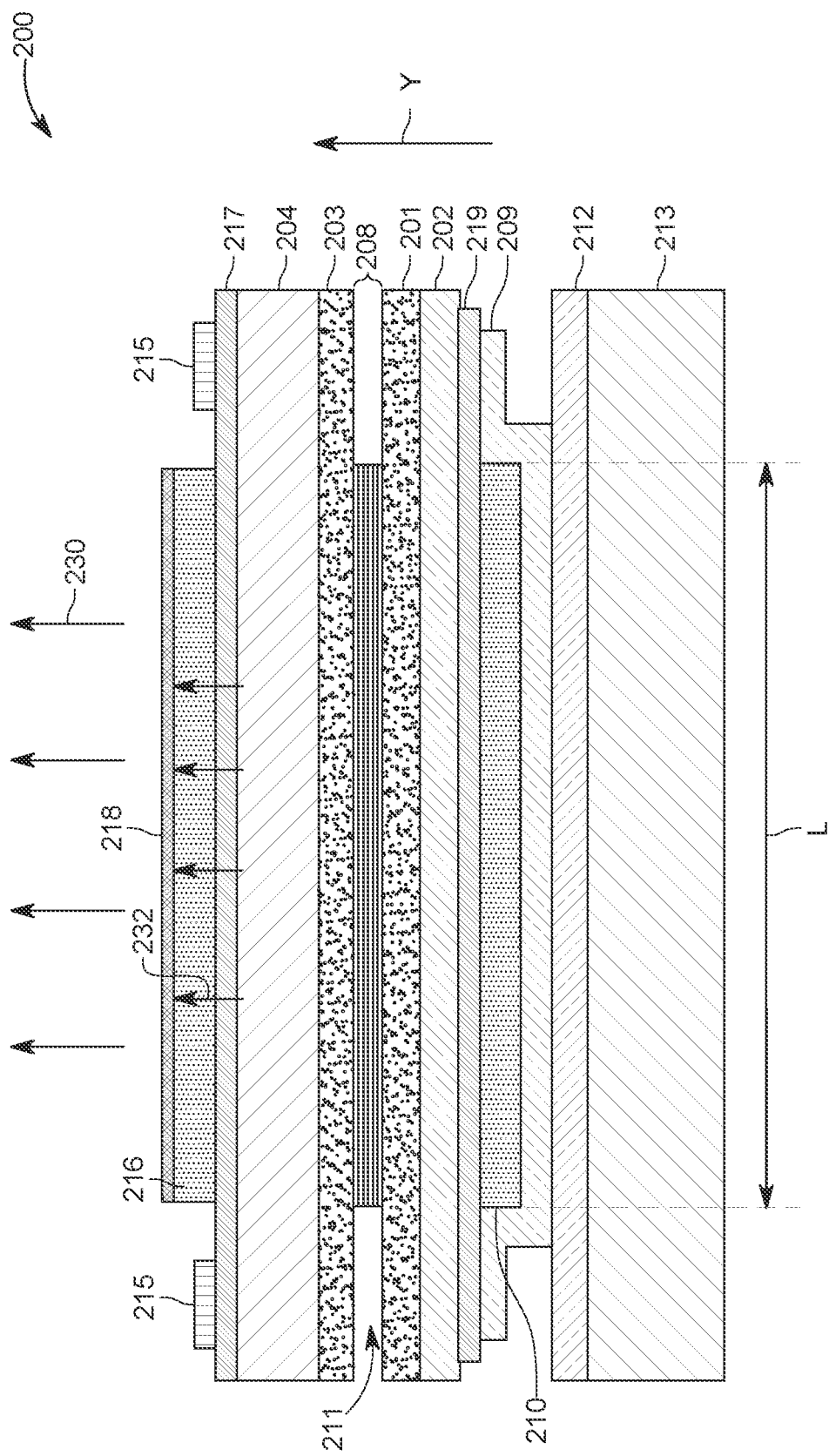
FIG. 2 illustrates a novel SLD device having a surface-emitting light configuration and a fast-acting phosphor material for changing a wavelength of a generated light.
Figure 3:
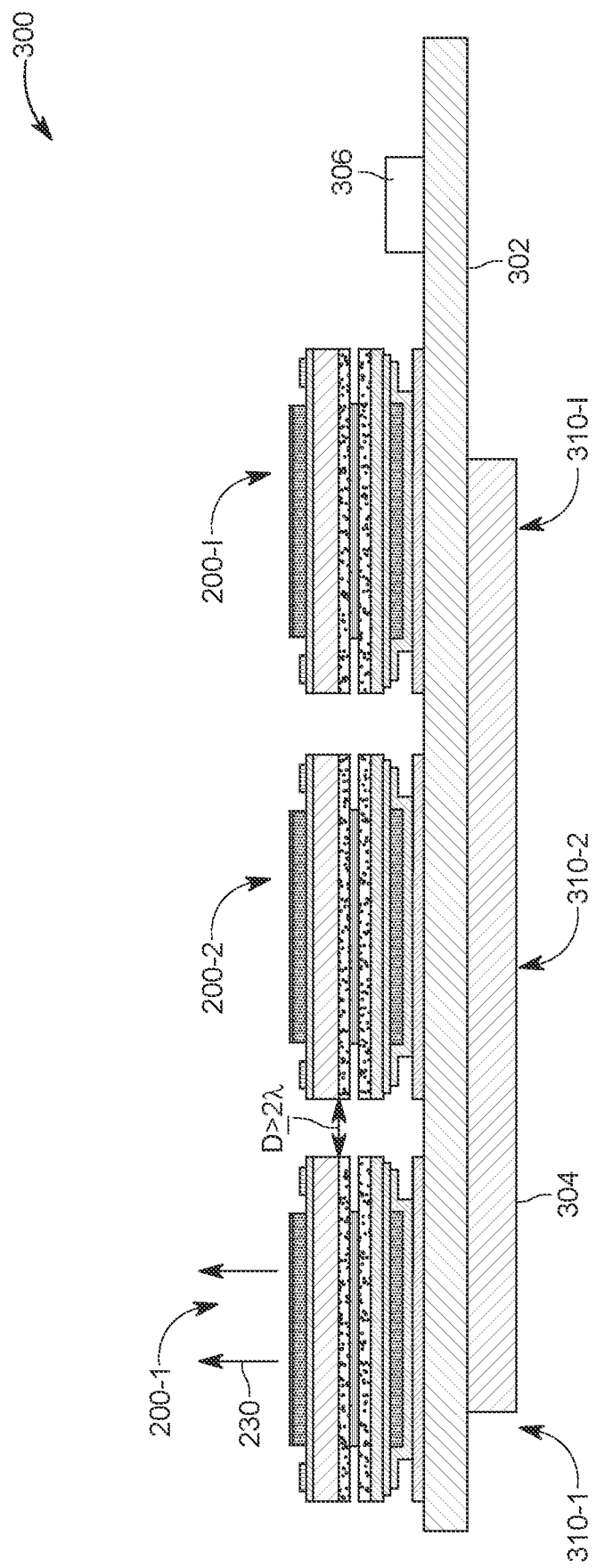
FIG. 3 illustrates an array of SLD devices that can implement wavelength-division multiplexing.

FIG. 2 illustrates one possible configuration of an individual novel SLD device 200. A closely spaced wavelength-division multiplexing array 300 is shown in FIG. 3 and includes plural vertical-cavity, surface-emitting blue-light SLD devices 200 and one or more phosphors. Using an SLD array 300 that is comprised of single-color SLD devices 200 is advantageous for inexpensive manufacturability and scalability. Closely spaced WDM in this embodiment refers to parallel transmission of multiple wavelengths in the visible color regime, which is achieved through the compositionally tunable phosphor material that are individually coating the plural SLD devices 200 on the SLD array 300. Alternately, the multiple wavelengths in the visible color regime can be implemented by having SLD devices 200 or SLD array 300 having different concentration of indium in the active region without the need for the phosphor material.

The SLD device 200 shown in FIG. 2 is an optoelectronic device operating in the amplified spontaneous emission regime, which offers high-optical power and directionality compared to the light-emitting diodes, while having better viewing comfort (speckle-free radiation) compared to the laser diodes. The surface-emitting design of the SLD device 200 makes the formation of large arrays 300 of SLDs possible. The array 300's configuration also simplifies the fabrication of high-resolution SLD displays, as discussed later.

The SLD device 200 includes a carrier substrate 213 (e.g., Si based) on which a metal layer 212 is formed for bonding the main structure above. The metal layer 212 may be formed of a p-metal, e.g., Ga, In, Sn, Ti, Pb or Pd. The main structure includes a p-metal layer 209, which is formed directly, such as through direct bonding, over the p-metal layer 212. The two layers may be made of the same material for bonding purposes. A DBR layer 210 is located over the p-metal layer 209. In one application, the DBR layer 210 is located within the p-metal layer 209, as shown in FIG. 2, so that only one surface of the DBR layer is flush with a face of the p-metal layer and all other surfaces of the DBR layer are buried within the p-metal layer. The bottom DBR layer 210 may include at least one pair of alternating layers. The first layer of the DBR layer may be a porous $SiO_2$ layer whereas the other may be made of $Si_3N_4$. The porosity of the $SiO_2$ layer causes the effective refractive index, n, of the layer to decrease. This is due to the lower refractive index of air (around 1) compared to that of $SiO_2$, which is around 1.46 in the visible band of the electromagnetic spectrum. Because the $Si_3N_4$ has a higher refractive index (around 2.04-2.07 for visible light) than that of $SiO_2$, the refractive index contrast, $\Delta n$, increases when the porosity is induced. The increase in $\Delta n$ helps in increasing the reflectivity of the DBR without the need of increasing the number of pairs of alternating $SiO_2/Si_3N_4$ layers. The reflectivity of the bottom DBR layer 210 is designed to be at least 99% so that almost no light escapes from the bottom of the SLD device. In an embodiment, the $SiO_2$ layers can be replaced with airgaps (based on etched $SiO_2$).

A current spreading layer 219 is formed over the DBR layer 210. The current spreading layer 219 may be made of indium tin oxide (ITO). Next a p-GaN layer 202 (cladding layer) is positioned over the current spreading layer 219, and a separate confinement heterostructure (SCH) layer 201 is located over the p-GaN layer 202. Another SCH layer 203 is formed to sandwich the active layer 208. The active layer 208 includes at least one pair of quantum wells, and the quantum wells are located between the two SCH layers 201 and 203. Each pair of quantum wells may include an $In_xGa_{1-x}N$ well, where x is the concentration of indium, and a GaN quantum barrier. The concentration of indium controls the wavelength of the emitted light, with higher indium concentrations resulting in longer wavelengths due to the decrease in the band gap of the quantum well. In one embodiment, x is chosen to be around 0.2, which corresponds to blue light generation at a wavelength of around 450 nm.

A Si-doped, n-type, GaN cladding layer 204 is formed over the SCH layer 203, followed by a top current spreading layer 217, and a top DBR layer 216, which is formed over the top current spreading layer. Further, an n-metal layer 215 is formed over the top current spreading layer 217. The n-metal layer 215 has a circular aperture through which the generated light 232 exits the SLD device 200.

Finally, a high-speed WDM-phosphor material may be placed on the top of the device, to form a phosphor layer 218. The phosphor layer 218 is selected to change the blue light 232 generated by the active region 208 into a different wavelength light 230, still in the visible spectrum. If the indium concentration in the active layer 208 of the SLD 200 is chosen such that it emits short-wavelength light, which is constituted by photons with higher energy, the light can be converted into any color in the visible band depending on the selected phosphor material 218. The color converter layer 218 can be designed to have non-overlapping spectra for different SLD devices, covering the whole visible band, such that each device 200 can transmit an optical signal using a specific wavelength. In other words, the SLD array 300 in FIG. 3 can be configured so that different SLD devices 200 have different phosphors or different compositions of the same phosphor or different concentrations of the indium in the active region with no phosphor layer to achieve more than one wavelength. Thus, a first SLD device 200-1 of the array 300 may have a first phosphor to emit a first light having a first wavelength, and a second SLD device 200-2 (generically referred herein to as 200-I) on the same array 300 may have a second phosphor, different from the first one, to emit a second light having a second wavelength. More than two phosphor materials may be used for a given SLD array. The number of different phosphor materials is selected based on the number of different wavelengths that are desired to be simultaneously generated by the SLD array 300. This allows for WDM implementation, potentially enabling tens of gigabits to be transmitted per second using this optical transmitter.

Note that in the following, the terms phosphor and phosphor material refer to a substance that exhibits the phenomenon of luminescence, i.e., this type of material emits light when exposed to some type of radiant energy (e.g., blue light generated by the active material in the SLD device). A phosphor material is usually made from a suitable host material with an added activator. One known type is a copper-activated zinc sulfide or a silver-activated zinc sulfide material. Other materials may be used as the phosphor, such as fast-acting halide perovskite materials.

When a voltage is applied between the layers 209 and 215, light is emitted in the active layer 208, and then reflected between the top DBR layer 216 and the bottom DBR layer 210 to increase the intensity of the light generated by the device through light amplification. The generated first light 232 then exits the device through the top DBR layer 216, which has a smaller reflectivity than the bottom DBR layer 210 and enters the phosphor layer 218. Depending on the composition of the phosphor layer 218, the emitted second light 230 has a wavelength different from the generated first light 232. However, note that the chemical composition of both the active layer 208 and the phosphor layer 218 are selected so that the wavelengths of the first and second lights 232 and 230 are in the visible spectrum. In one embodiment, either one of the compositions or both of them are selected so that the wavelength of the emitted light 230 has substantially a single wavelength. However, if more wavelengths are desired to be emitted by a single SLD device 200, the selection of the components of the active layer 208 and/or the phosphor layer 218 can be changed to achieve this goal. In one application, it is possible to have the wavelength of the generated light 232 not in the visible spectrum, but the wavelength of the emitted light 230 to be in the visible spectrum. The reverse situation is also possible. If the SLD device is required to emit blue light and the active layer 208 has been selected to generate blue light, no phosphor material 218 is provided over the DBR 216. In one embodiment, a length L of the active layer 208 is made to be equal to the length of the top and bottom DBR layers 216 and 210, but also smaller than the length of the SCH layers 203 and 201 for light and current confinement. For example, as shown in FIG. 2, an empty region 211 is formed between the SCH layers 203 and 202, next to the active layer 208. In one embodiment, the phosphor layer 218 is formed to have the same length L as the active layer 208.

A plurality of SLD devices 200-I can be formed on a common substrate 207 (see FIG. 4A) and then they can be transferred onto a carrier substrate 302 (which corresponds to substrate 213 in FIG. 2), as shown in FIG. 3, to form an array 300 of SLD devices. Any number of SLD devices may be located on a same substrate 302. A distance D between adjacent SLD devices is $2\lambda$ or more, where $\lambda$ is the wavelength of the emitted light 230. If two adjacent SLD devices emit lights having different wavelengths $\lambda_1, \lambda_1$, then the distance D is the sum of the two wavelengths. In one application, the distance D is between 1 and 100 μm. In this or another application, the carrier substrate 302 may be a CMOS driver IC board. The number of the SLD devices 200 on the common substrate 302, their arrangement, and the dimension of the array can vary depending on the targeted application. The IC board fabricated on the carrier substrate 302 can be configured to control each SLD individually and the carrier substrate 302 may be mounted on a heatsink 304 for thermal stability. In one application, a global controller 306 may be formed on the same substrate 302 and it may be linked to each of the SLD device 200-I, for controlling the generated light of each such device. The global controller 306 may include any electronics that can support encoding and decoding processing, which may be used for transmitting information through the emitted light 230. The global controller 306 may be connected to a server, communication network, Internet, etc. so that information can be received at the controller, can be encoded into the emitted light 230, and then provided as ambient light to a user that uses the array 300 as an illumination appliance. A smart device of the user can be configured to detect this light, and decode the information encoded into it, for being able to read that information. In this way, the light appliance can generate simultaneously ambient white light for the user and at the same carry information for the device used by the user, e.g., for providing connectivity to an external device or network or Internet.

The array 300 can be configured to have a first set 310-1 of SLDs that emit a first wavelength, a second set 310-2 of SLDs that emit a second wavelength and so. Any number of sets 310-I may be selected, and the number of sets is identical to the number of wavelengths that need to be generated by the array 300. For example, if only three wavelengths need to be generated (green, red and blue), then only three sets 310-I of SLDs are made, each set including any number of SLDs, that emit the same wavelength.

Figure 4A:
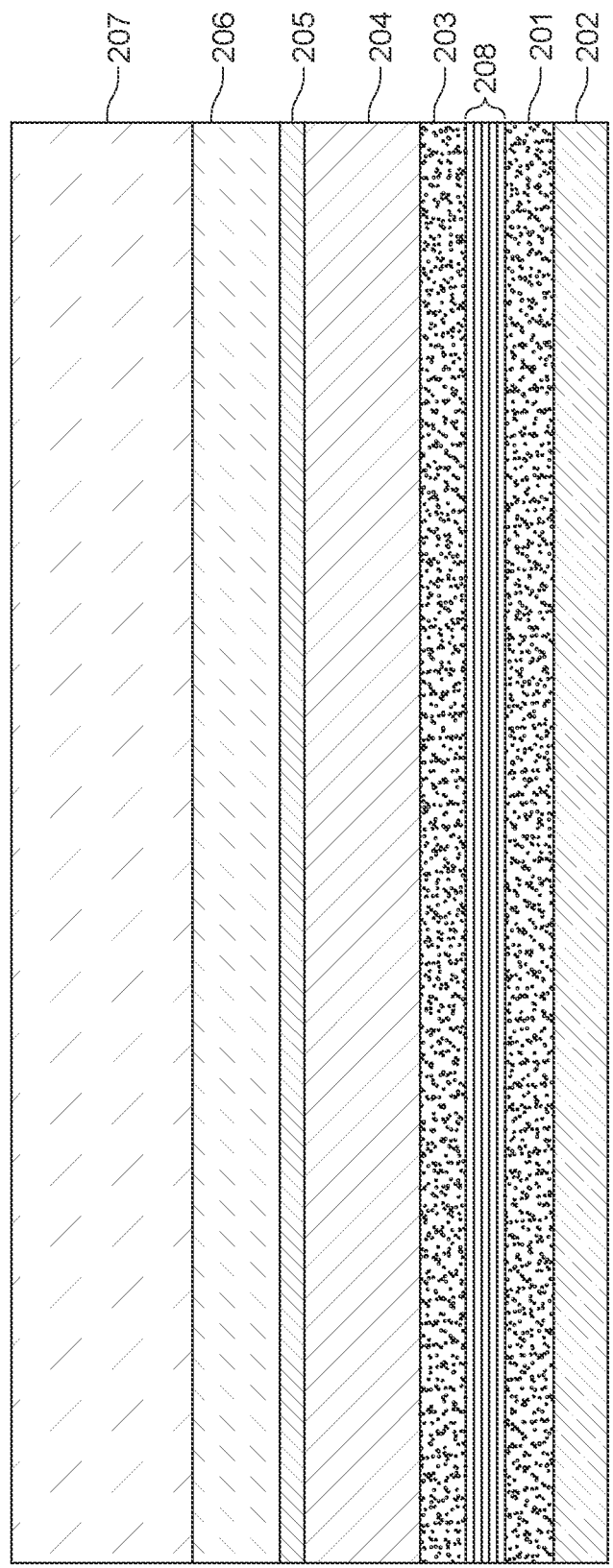
FIGS. 4A to 4F illustrate a method for manufacturing the SLD device having a surface-emitting light configuration and a fast-acting phosphor material.

A method for making the SLD device shown in FIG. 2 is now discussed with regard to FIGS. 4A to 4F. FIG. 4A shows an initial structure being fabricated by first growing the main layers on a sapphire substrate 207 using metalorganic chemical vapor deposition (MOCVD). An unintentionally doped GaN layer 206 is grown on the substrate 207 as a buffer layer. An InGaN/GaN sacrificial layer 205 (e.g. 405 nm thick) is grown on the buffer layer 206. The Si-doped, n-type, GaN bottom cladding layer 204 is grown on top of the buffer layer 206, followed by a top separate confinement heterostructure (SCH) layer 203. The active region 208 includes at least one pair of quantum wells, which lies between two SCH layers 203 and 201. Each pair of quantum wells may include an $In_xGa_{1-x}N$ well, where x is the concentration of indium, and a GaN quantum barrier. The concentration of indium controls the wavelength of the emitted light, with higher indium concentrations resulting in longer wavelengths due to the decrease in the band gap of the quantum well. In one embodiment, x is chosen to be around 0.2, which corresponds to blue light generation at a wavelength of around 450 nm. A Mg-doped, p-type, GaN top cladding layer 202 is grown on the top SCH layer 201.

Figure 4B:
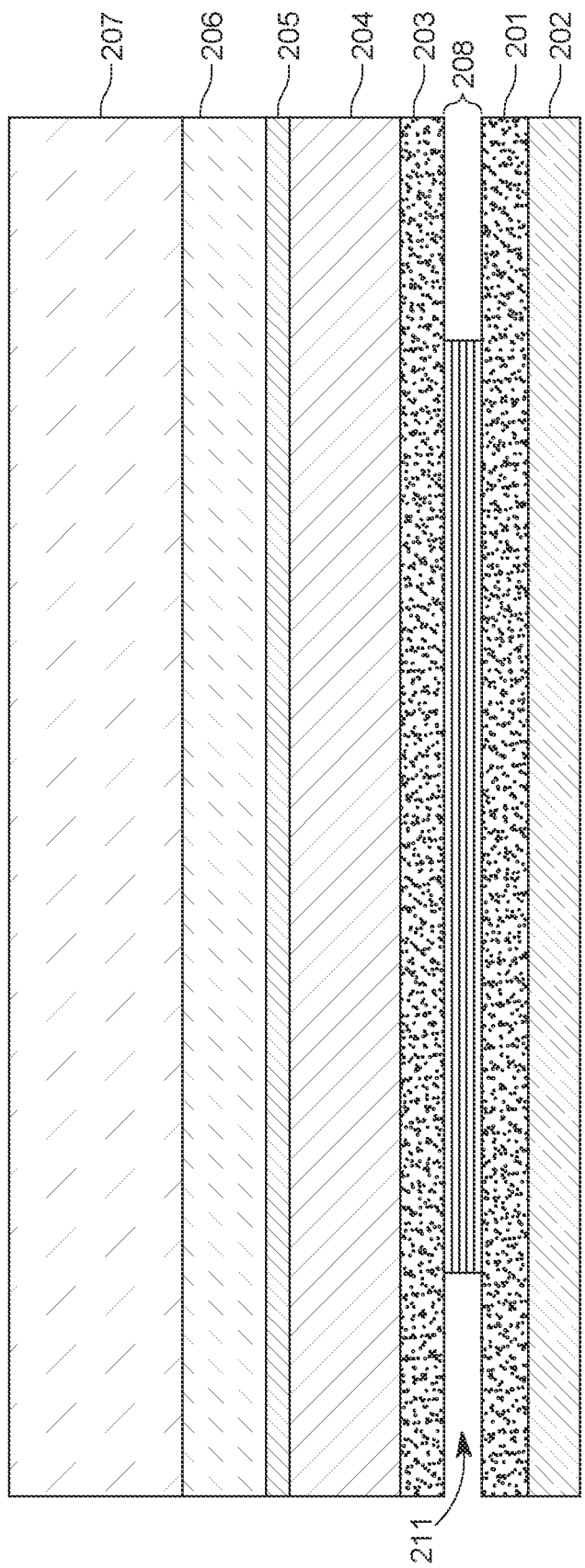
Figure 4C:
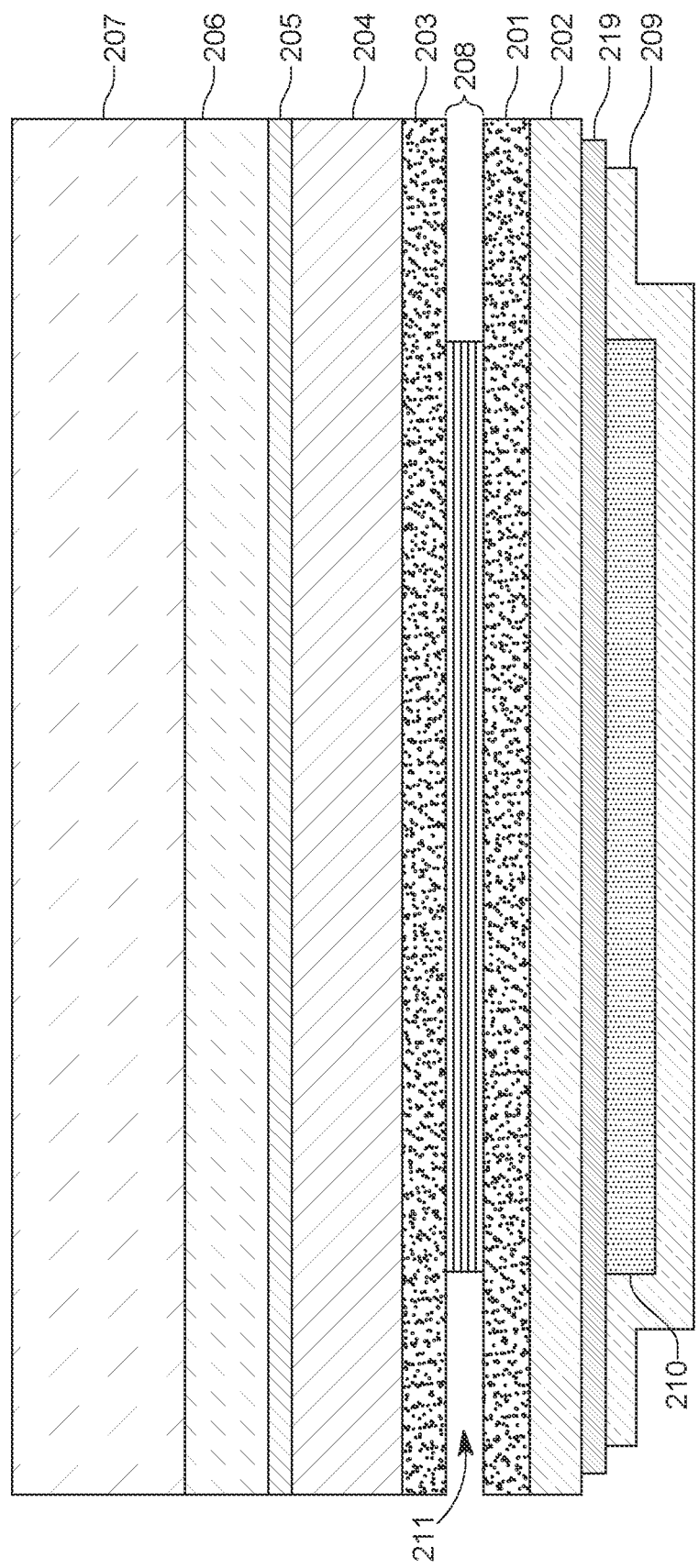

Photoelectroless chemical etching is then used to etch the side wall of the active region 208 to form an empty region 211, as shown in FIG. 4B, to achieve current and optical confinement. The current confinement is achieved by narrowing the length L of the active layer 208. Then, as shown in FIG. 4C, a current spreading layer 219, which is made of indium tin oxide (ITO) in one embodiment, and the bottom DBR layers 210 are grown on the p-GaN layer 202. The bottom DBR layer 210 includes at least one pair of alternating layers. In one embodiment, the first layer of the DBR 210 is a porous $SiO_2$ layer whereas the other layer is made of $Si_3N_4$. The porosity of the $SiO_2$ layers, which is induced by selectively etching it using photoelectroless chemical etching or by directly growing porous $SiO_2$ using plasma-enhanced chemical vapor deposition (PECVD), causes the effective refractive index, n, of the layer to decrease. This is due to the lower refractive index of air (around 1) compared to that of $SiO_2$, which is around 1.46 in the visible band of the electromagnetic spectrum. Since $Si_3N_4$ has a higher refractive index (around 2.04-2.07 for visible light) than that of $SiO_2$, the refractive index contrast, $\Delta n$, increases when the porosity is induced. The increase in $\Delta n$ helps in increasing the reflectivity of the DBR without the need of increasing the number of pairs of alternating $SiO_2/Si_3N_4$ layers. The reflectivity of the bottom DBR layer 210 is designed to be at least 99%. In an embodiment, the $SiO_2$ layers can be replaced with airgaps (based on etched $SiO_2$). The p-metal 209 is then deposited on the bottom DBR layer 210.

Figure 4D:
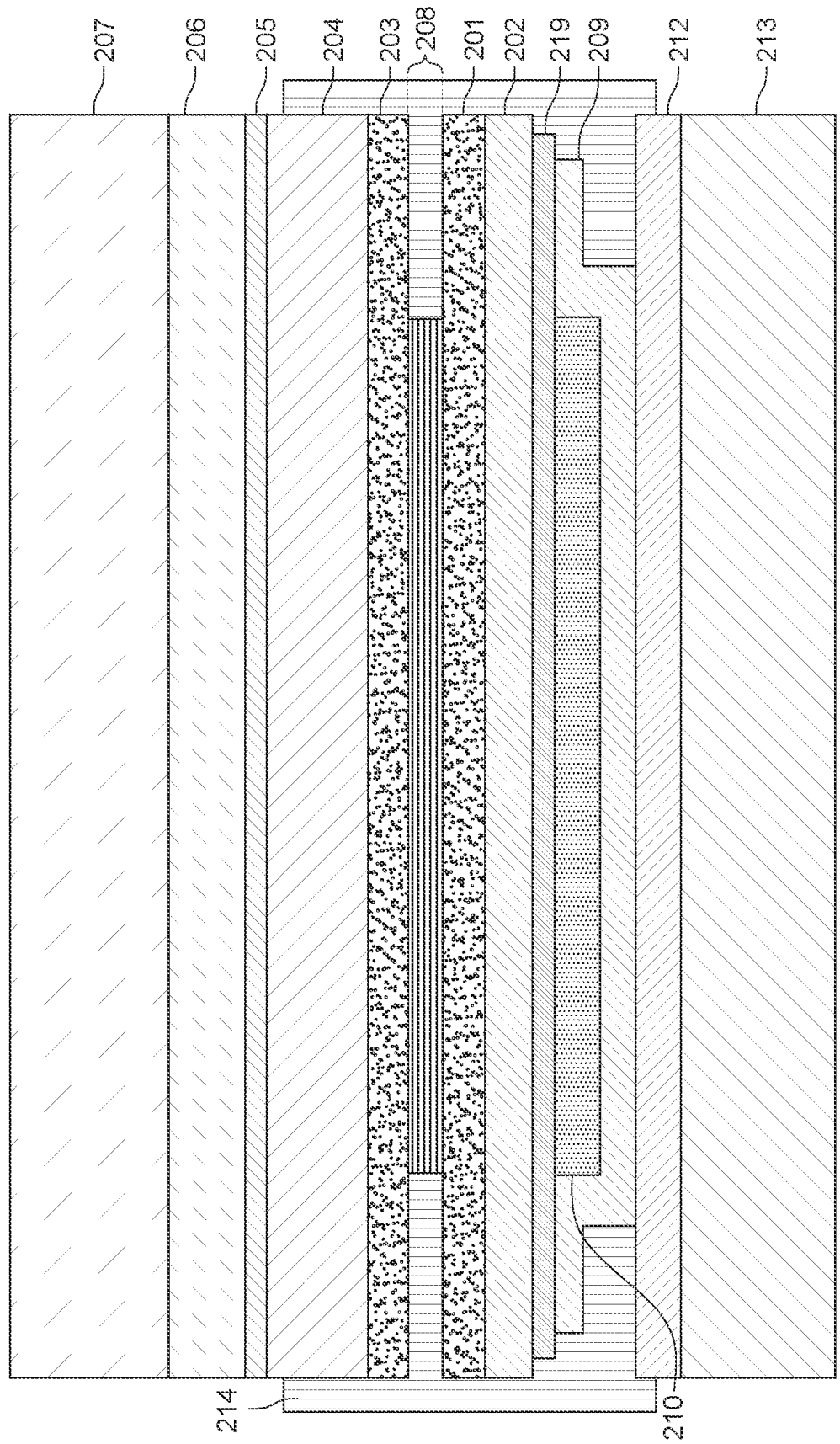
Figure 4E:
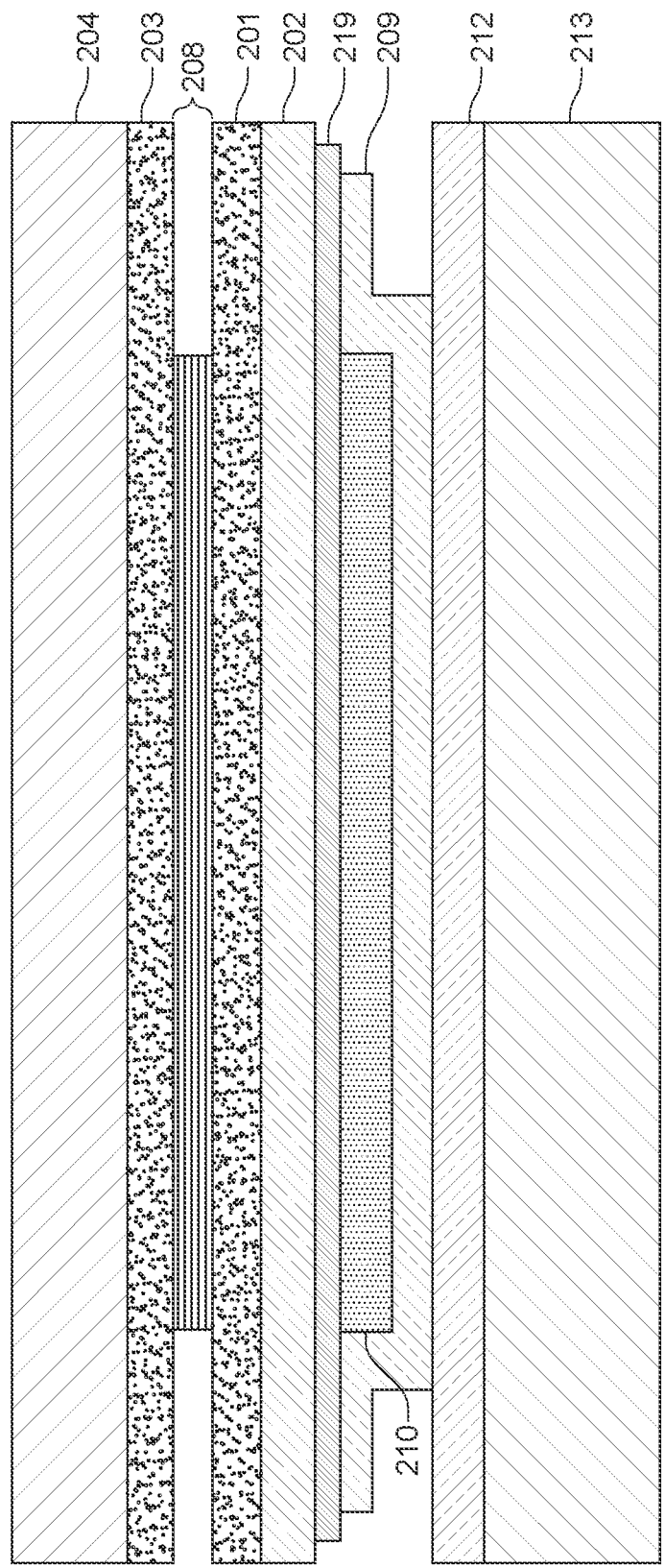

The whole structure in FIG. 4C is then bonded to a carrier substrate 213, as shown in FIG. 4D. The carrier substrate 213 is deposited with a layer 212 of the same metal used for the p-metal layer 209. The side walls of the structure, except for the layers above the n-GaN layer 204, are then passivated with a polymer 214, to protect them during the removal of the substrate 207, as also illustrated in FIG. 4D. After the move, the polymer 214 is removed. A short-pass optical filter with a cutoff between 405 and 435 nm may be used with a broadband light source in the PEC etching process of the sacrificial layer 205, to remove this layer. The structure, after the removal of the top layers, is shown in FIG. 4E.

Figure 4F:
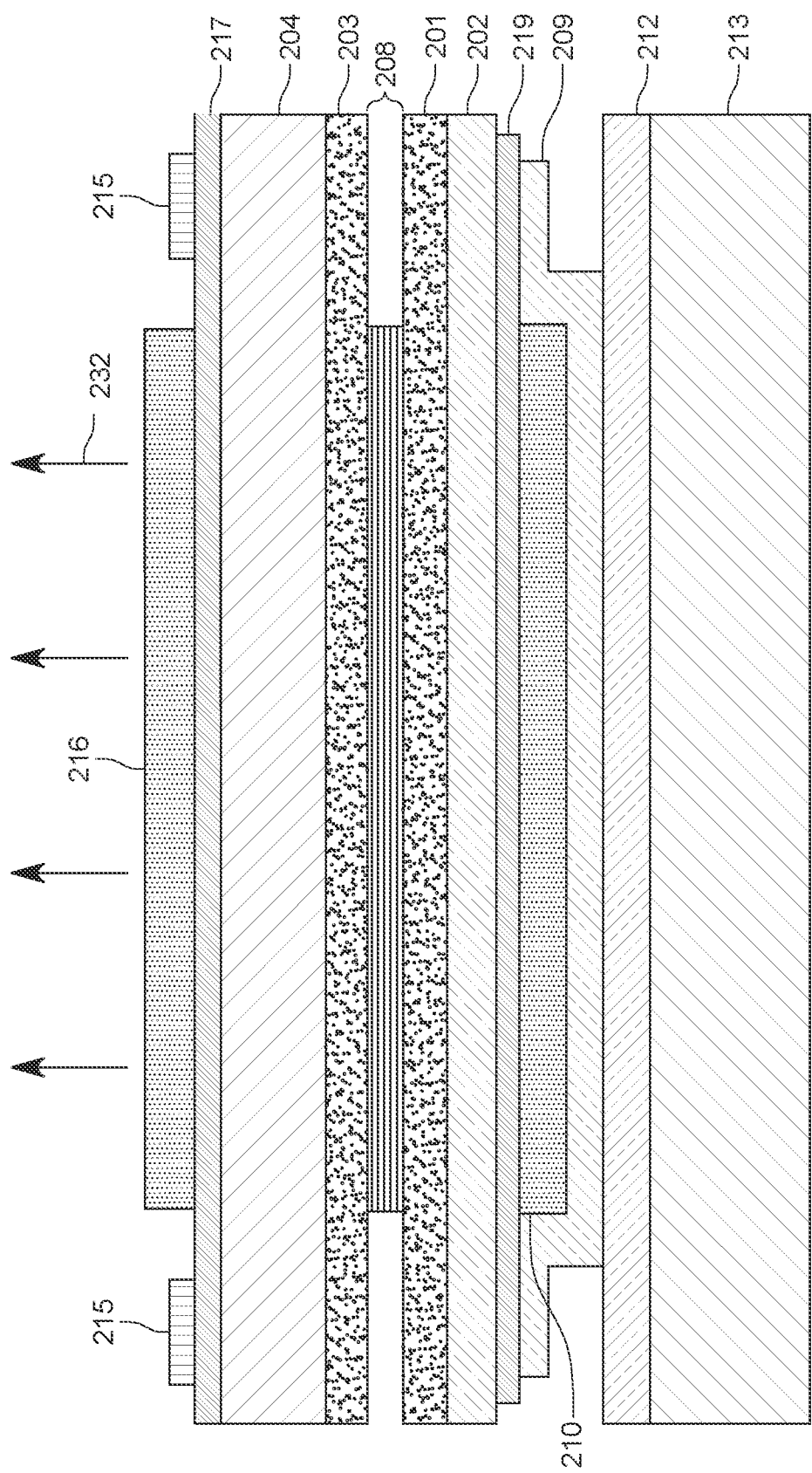

Next, as shown in FIG. 4F, a top current spreading layer 217, the n-metal layer 215, and the top DBR layer 216 are formed on top of the n-GaN layer 204, with the top DBR layer 216 having a partial reflectivity lower than that of the bottom DBR layer 210, so that the emitted light 232 exits the device 200 through the top DBR layer 216. The n-metal layer 215 has a circular aperture through which the generated light 232 passes.

Figure 5:
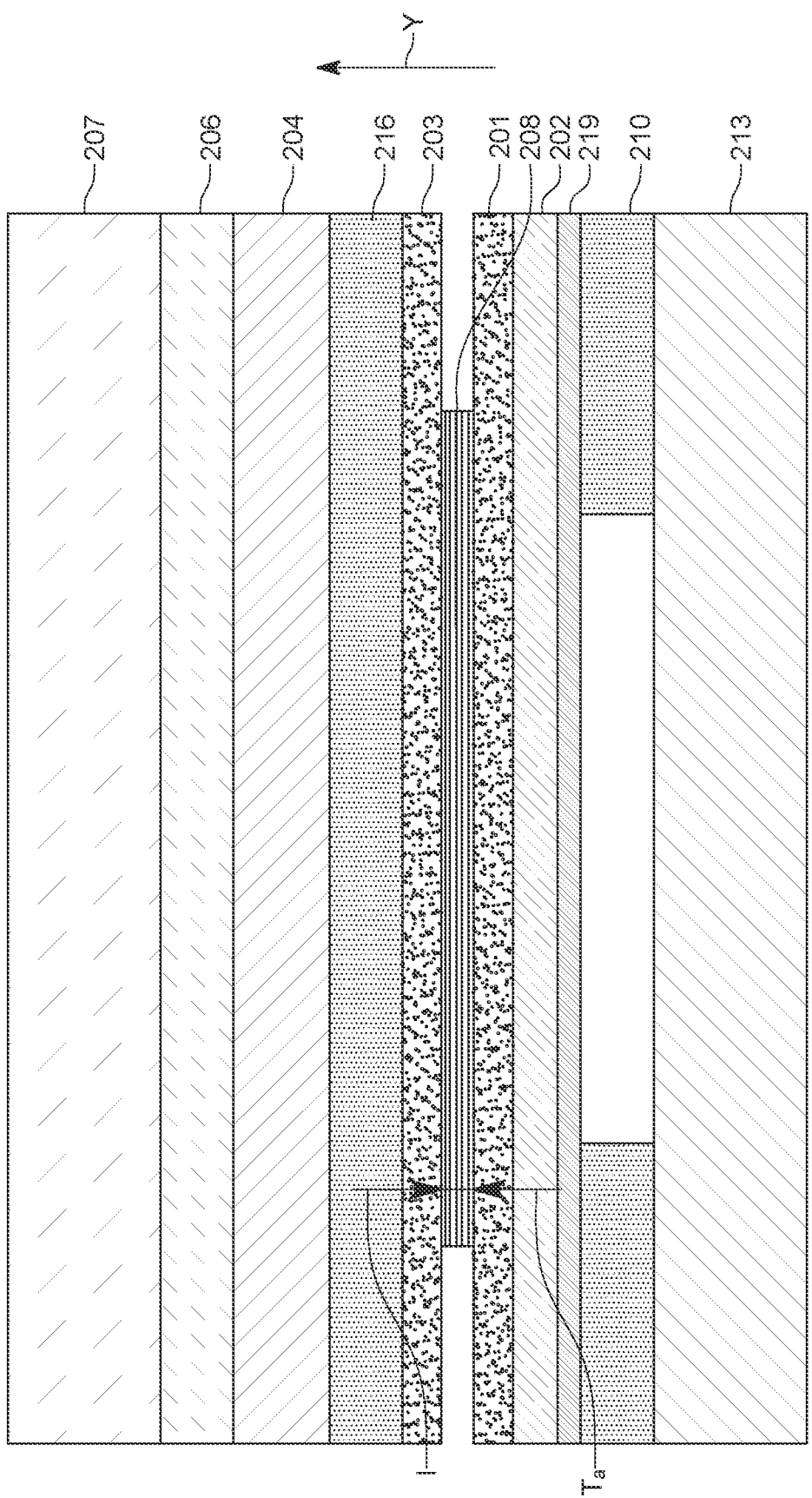
FIG. 5 illustrates a different method for manufacturing the SLD device having a surface-emitting light configuration and a fast-acting phosphor material.

In an alternative embodiment, as shown in FIG. 5, the fabrication is achieved by combining two partial structures to each other. The first partial structure is associated with the top DBR layer 216, which consists of the porous-GaN/AlGaN layers grown directly in between the n-GaN layer 204 and the top SCH layer 203. The first partial structure is grown on the main substrate 207. The second partial structure, for the bottom DBR 210, which consists of InGaN/GaN layers, is formed on the carrier substrate 213. The sidewall of the InGaN layers are subsequently made porous through photoelectroless chemical etching such that the resultant porous-InGaN/InGaN has an effective index much lower than that of InGaN alone. The two partial structures are then bonded using a transparent oxide, gold compression, or eutectic bonding.

Figure 6:
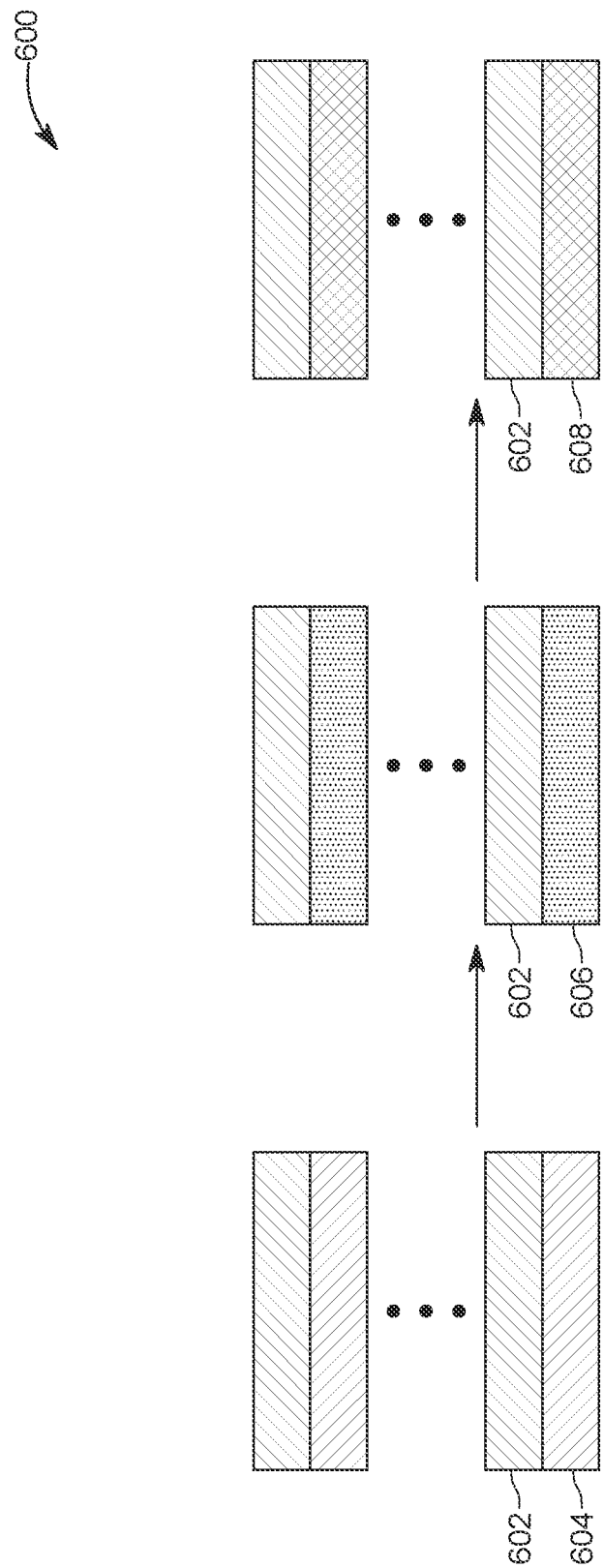
FIG. 6 illustrates a method for forming top and bottom distributed Bragg reflectors for the SLD device.

Alternately, the InGaN/GaN layers of the DBR layer can be replaced using porous $SiO_2/Si_3N_4$ DBRs. These layers can be processed by providing a stack 600 of $Si_3N_4$ layers 602 and amorphous Si layers 604, as shown in FIG. 6, using photoelectroless chemical etching for forming holes or pores into the amorphous Si layers 604, to obtain porous Si layers 606, and then applying a step of thermal oxidation for changing the porous Si layers 606 into porous $SiO_2$ layers 608.

The design of the DBR layers 210 and 216 depends on the targeted wavelength λ to be emitted by the active layer 208. In one application, each layer needs to have an optical thickness around λ/4 in order for the DBR to reflect light waves with wavelengths around λ. The optical thickness, $T_o$, is equal to the product of the geometrical thickness of the layer, T, and its refractive index, n, at a wavelength of λ. Satisfying this condition will result in constructive interference at the surface of the DBR among the beams partially reflected by each of its layers. The total reflectivity of the DBR, R, can be calculated using:

$$R = \left[\frac{n_b(n_2)^{2N} - n_a(n_1)^{2N}}{n_b(n_2)^{2N} + n_a(n_1)^{2N}}\right]^2, \quad (1)$$

where $n_b$ is the refractive index of the layer from which light impinges on the DBR, $n_a$ is the refractive index of the layer following the DBR, and $n_{1,2}$ are the refractive indices of the two alternating layers constituting the DBR.

The two DBRs 210 and 216 forming the vertical cavity of the SLD device improve the overall optical gain of the SLD device 200 to achieve ASE. The single-pass optical power gain of an edge-emitting SLD, G, is defined as the ratio between its output optical power to the power generated by spontaneous emission. The power gain G can be expressed as:

$$G = \exp\left(\Gamma g_o \eta l \frac{J}{T_a}\right) \exp(-\alpha l), \quad (2)$$

where Γ is the confinement factor, which is defined as the ratio of the light field in the active layer to the total field, $g_o$ is the gain coefficient of the active layer, η is the quantum efficiency, J is the injected current density, $T_a$ is the thickness of the active layer (see FIG. 5), α is its absorption coefficient, and l is the length of the active region in the direction of light propagation (indicated by axis Y in FIGS. 2 and 5).

For a surface-emitting SLD device, the length l is equal to the thickness of the active layer, $T_a$, because the light propagates vertically through the active layer along the same direction as the flow of the injected current. However, the thickness $T_a$ is significantly shorter than the value of l in the edge-emitting configuration (see device 100 in FIG. 1A), which exponentially decreases the optical power gain in the surface-emitting device. The purpose of the DBR layers 210 and 216 in the SLD device 200 is to counter the short length l by providing multiple passes of the light beam through the active layer 208, effectively increasing the distance the light travels through the gain medium and, therefore, increasing the gain. Moreover, unlike in the edge-emitting configuration shown in FIG. 1A, in the configurations shown in FIGS. 2 and 5, light travels through the different layers of the SLD device 200, causing losses due to the light absorption of each layer. Because of that, the second exponential in the optical gain equation (2) needs to be modified to take into account the different absorption coefficients of each layer and its thickness in order to calculate the gain of a single pass of the surface-emitting design, $G_{sp}$.

Figure 7:
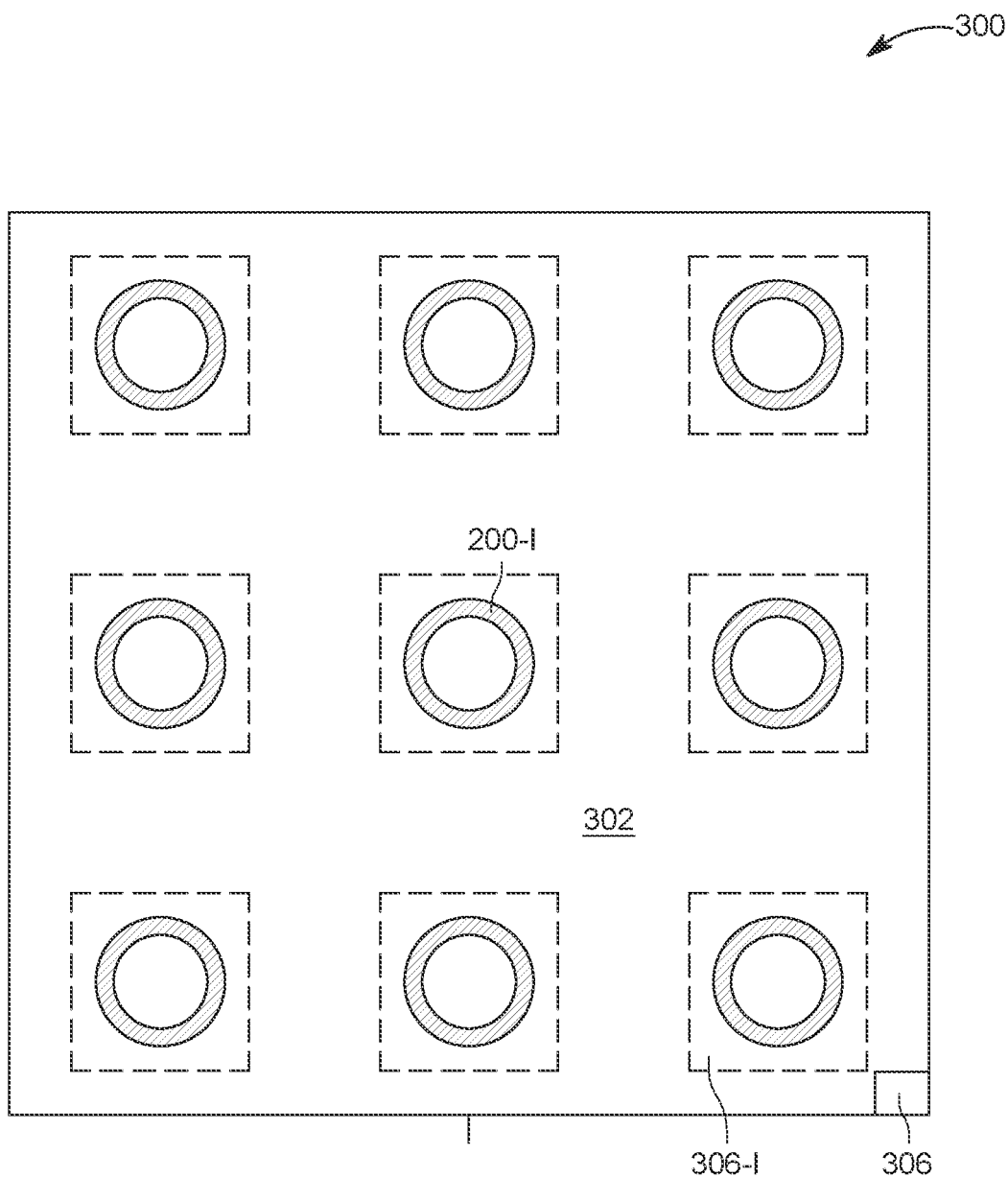
FIG. 7 illustrates a top view of an array of SLD devices located on a common substrate.

The surface-emitting configuration of the device 200 shown in FIG. 2 allows for the fabrication of an array 300 of SLD devices 200 on the same CMOS driver IC board, as shown in FIG. 3. A top view of such an SLD array 300 and the CMOS driver IC board located on the carrier substrate 302 is shown in FIG. 7. It is noted that the SLD devices 200-I are formed on one face of the board 302 while corresponding local driving structures 306-I are formed on the opposite face of the board, or within the board. Thus, the embodiment shown in FIG. 7 is configured to provide a local controller 306-I for each SLD device 200-I. A global controller 306 that coordinates the work of all the local controllers 306-I may also be provided on the board 302. The SLD devices 200-I may be distributed along a grid as shown in FIG. 7, over the board 302, or along any other pattern.

Figure 8:
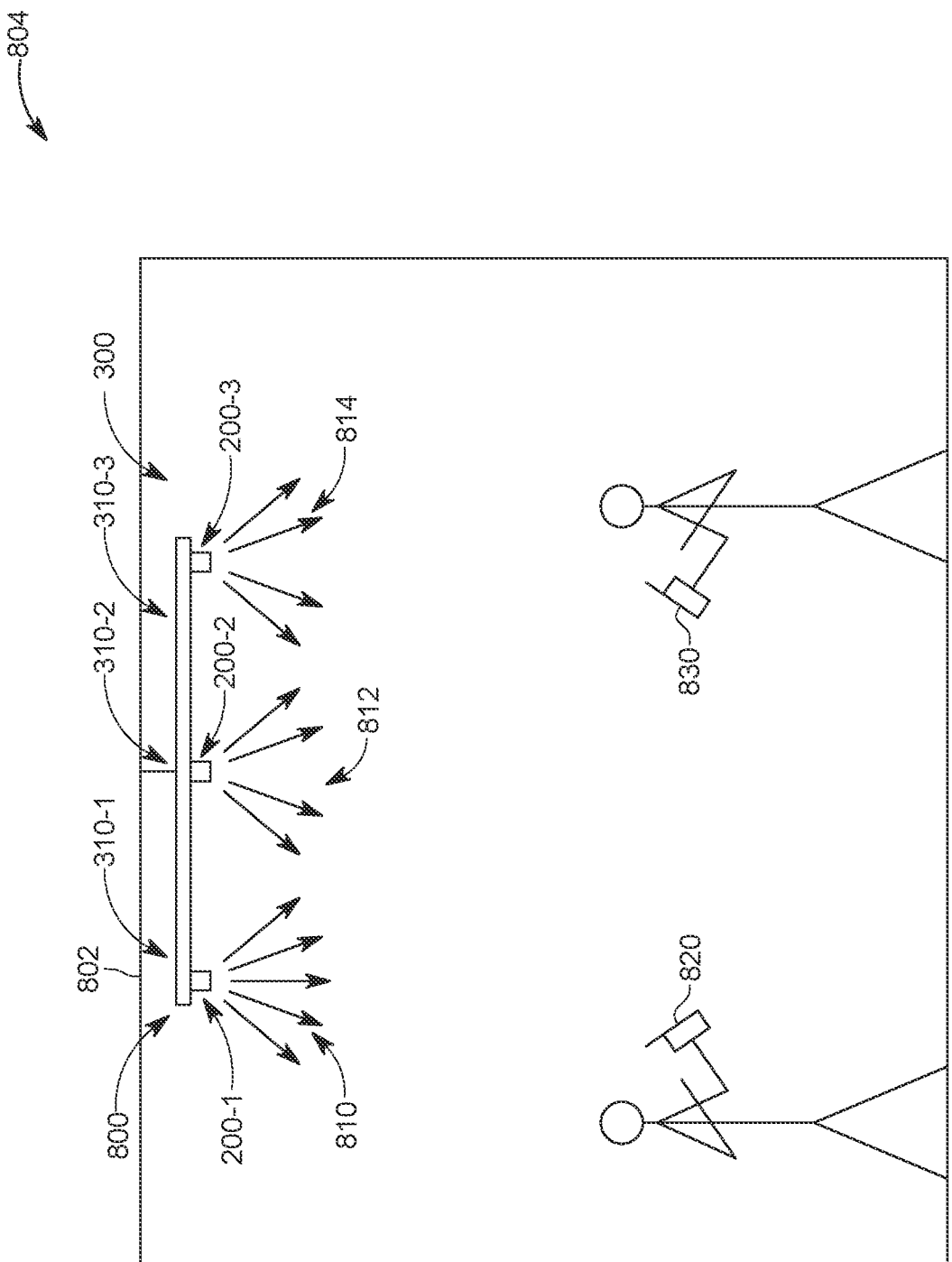
FIG. 8 illustrates one implementation of the array of the SLD devices for illuminating a chamber and also for transmitting information to smart devices placed in the chamber.

In one embodiment, as illustrated in FIG. 8, the array 300 together with the local controllers 306-I and/or the global controller 306 may be packaged into a single lighting appliance 800, which is attached to the ceiling 802 of an enclosure (e.g., room) 804. The appliance 800 is configured to generate two or more light beams 810 to 814 having different wavelengths by changing the concentration of indium in the active region so that WDM communication can be established between the appliance and plural communication devices 820 and 830 present in the room.

More specifically, FIG. 8 illustrates a situation in which two persons are present in the room, each person having their own smartphone. The array 300 of the appliance 800 has three types of SLD devices 200-I (I=1, 2, 3), each emitting a corresponding light beam 810 to 814. The three types of SLD devices are grouped according to three sets of SLDs, a first set 310-1 of SLDs 200-1, a second set 310-2 of SLDs 200-2, and a third set 310-3 of SLDs 200-3. In this embodiment, the first light beam 810 generated by the first set 300-1 has a first wavelength $\lambda_1$ (e.g., 450 nm), the second light beam 812 generated by the second set 300-2 has a different second wavelength $\lambda_2$ (e.g., 550 nm), and the third light beam 814 generated by the third set 300-3 has a different third wavelength $\lambda_3$ (e.g., 650 nm). In one application, the wavelengths emitted by these SLD devices may deviate by about 10% from the values noted above and for this reason, the term "substantially" is used herein to indicate this deviation. In still another application, different wavelengths are selected. In yet another application, more than three different wavelengths are selected to be generated by the plurality of SLD devices. The number of SLD devices may be in the range of hundreds to tens of thousands for a given lighting appliance 800.

The combination of the three light beams 810, 812, and 814 in this embodiment generates white light 816, which is one of the purposes of the lighting appliance 800. However, at the same time, the local controller 306-I of each SLD device 200-I, and/or the global controller 306 process information received from an external server (e.g., Internet provider) and encodes various packets of data with one or more codes and ensures the transmission of the different packets to each smartphone 820 and 830 through the light beams 810 to 814. In other words, the local and/or global controllers of the appliance 800 are configured to send data, along different channels, e.g., using the first light beam 810 for the first smartphone 820 and using the third light beam 814 for the second smartphone 830, which is nothing else than WDM communication using visible-light. This specific WDM scheme is also a closely spaced WDM scheme because it achieves parallel transmission of multiple wavelengths in the visible color regime, which is achieved through the use of the high-speed combinatory phosphors that are coated on the different SLD devices 200 of the SLD array 300 in order to convert the generated blue light 232 into other wavelengths 230 for transmitting data without interference or by changing the concentration of indium in the active region 208. This scheme can be scaled up to as many wavelengths as desired. In one embodiment, the emitted wavelengths can cover both the visible and invisible spectrum. Because the room is small in this embodiment, and the number of people that are present in the room is limited, the number of light beams having different wavelengths can also be limited. However, if the enclosure is larger, e.g., a concert room, then the number of emitted light beams having different wavelengths may be adjusted accordingly. In other words, the lighting appliance 800 can be scaled up, if necessary, to accommodate many smart devices at the same time using the WDM method.

In another embodiment, the high-speed WDM-phosphors 218 can be individually deposited on the light-emitting surface of the SLD device 200 to change the wavelength of the light generated by each SLD. If the indium concentration in the active layer of the SLD is chosen such that it emits short-wavelength light, which is constituted by photons with higher energy, the light can be converted into any color in the visible band depending on the used phosphor material. The color converters can be designed to have non-overlapping spectra, thus covering the whole visible band such that each SLD device can transmit an optical signal using a specific wavelength. This allows for WDM implementation, potentially enabling tens of gigabits to be transmitted per second using this optical transmitter.

Figure 9:
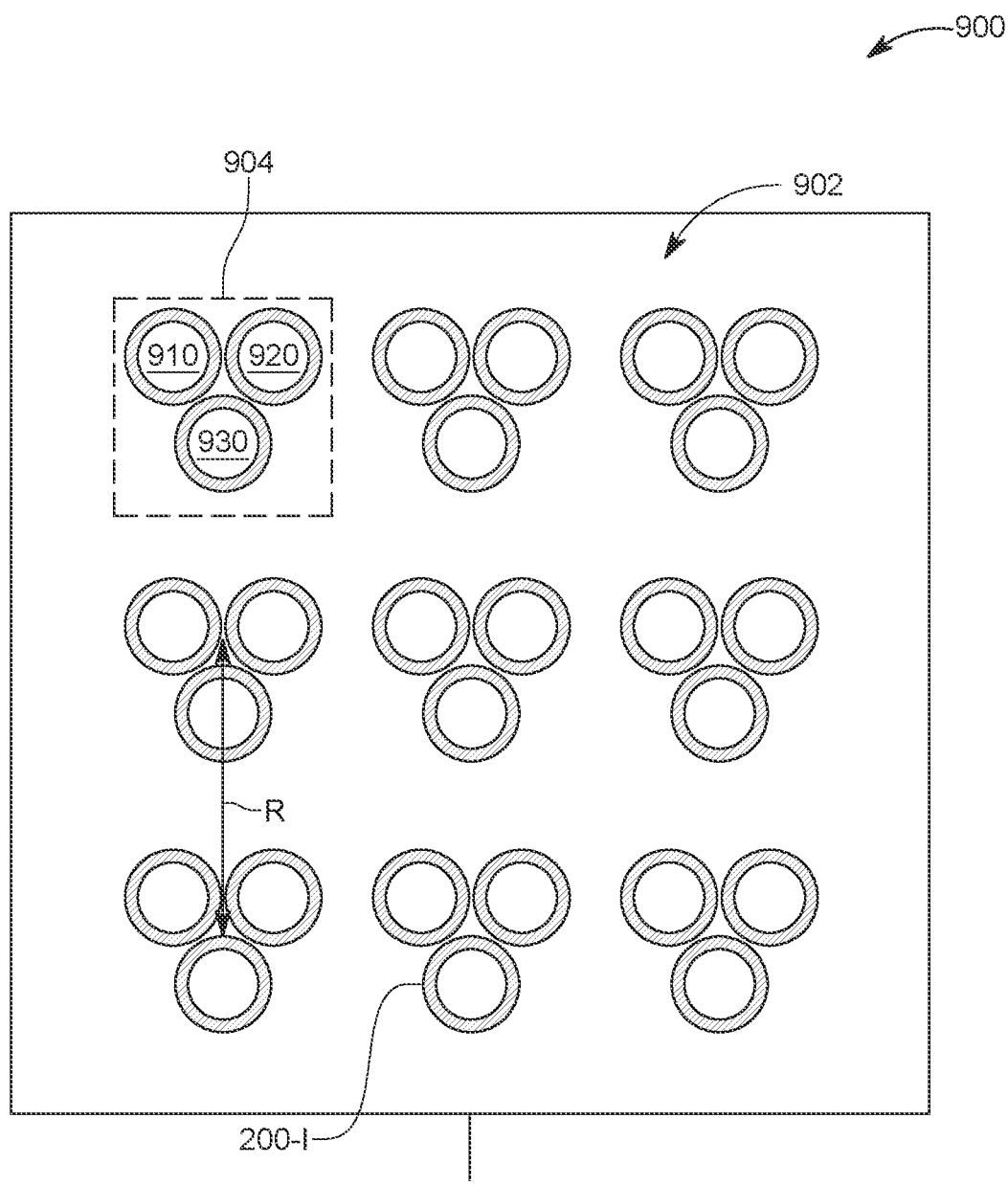
FIG. 9 illustrates a display that uses plural SLD devices.

Moreover, if many such SLDs are formed in an array 902 as illustrated in FIG. 9, the light from each SLD device 200-I can be converted into a specific wavelength to form a display 900. Such a display can be configured to have plural light generating units 904, where each light generating unit includes a red-light generating SLD device 910, a green-light generating SLD device 920, and a blue-light generating SLD device 930 by changing the concentration of indium in the active region 208. In another embodiment, the three SLD devices 910 to 930 in the light generating unit 904 are designed to have the same concentration of indium in the active region 208, and the different colors are achieved using a red-light generating phosphor deposited on the first SLD device 910, a green-light generating phosphor deposited on the second SLD device 920, and a blue-light generating phosphor deposited on the third SLD device 930. If the SLDs in the display 900 are selected to originally emit blue light, the blue phosphor material on the third SLD device 930 is not needed. The SLD devices 200-I that make one single light generating unit 904 are placed as close as possible, for example, at about the distance D discussed with regard to FIG. 3, and two adjacent light generating units 904 are placed at a distance R (equal or larger than D), which depends on the resolution of the display 900. It is possible in this embodiment to use other phosphor materials to emit any desired wavelength in the optical spectrum.

In still another embodiment, spatial-division multiplexing (SDM) can be used instead of WDM to avoid the bandwidth limitations imposed by the long lifetime of the secondary photons generated from the color converters and their limited stability over time. However, because the SLDs 200-I are packed closely together, transmitting the light in the same direction, as is the case in FIG. 3, will cause crosstalk between the channels in the SDM system if the SLDs are emitting light with the same or similar wavelengths. Thus, in this embodiment, the SLD array 300 is configured so that the emitted light 230-I from each SLD 200-I is directed into a different angle 9, relative to the gravity (indicated by axis Y) to form an angle-diversity transmitter 1000, as shown in FIG. 10.

Figure 10:
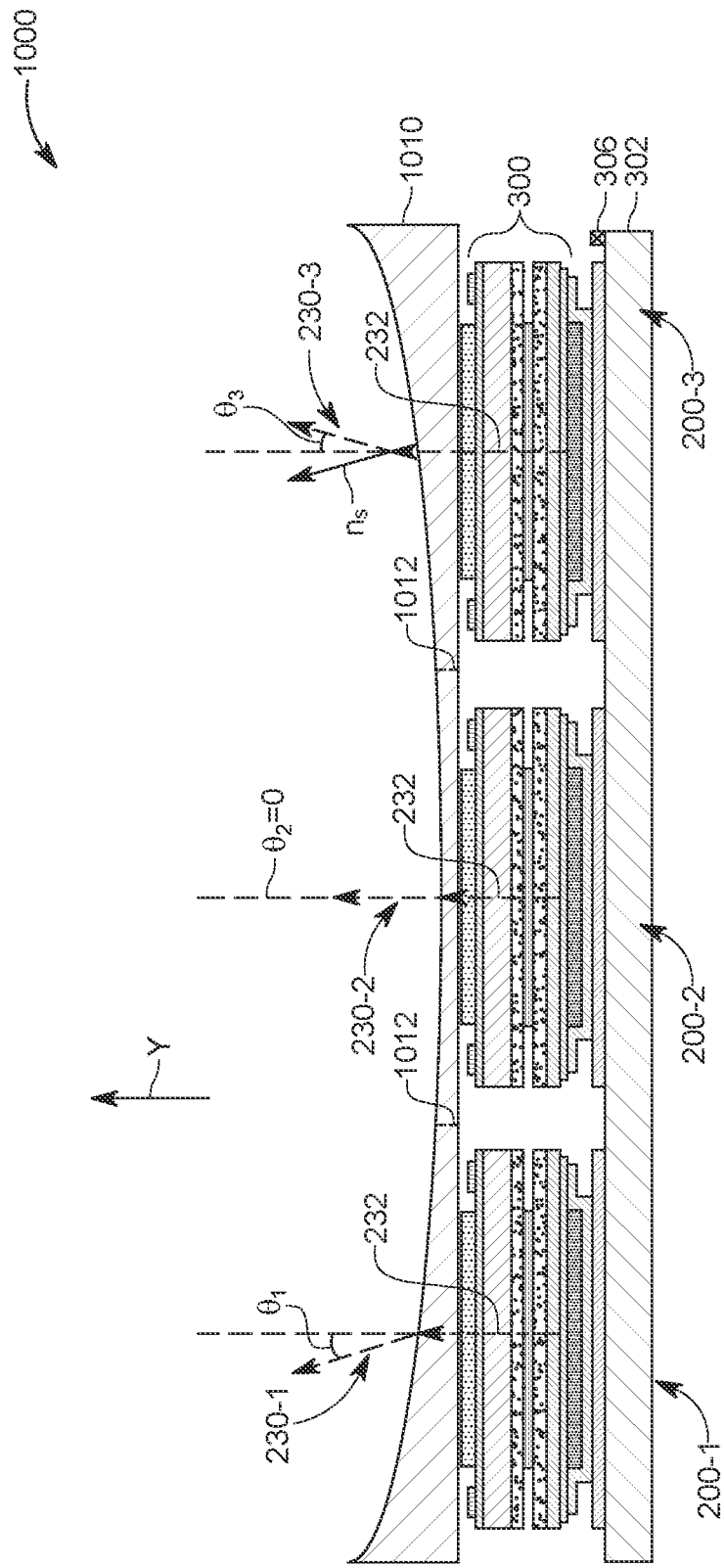
FIG. 10 illustrates another array of SLD devices that have a lens for changing a propagation direction of the emitted lights to implement space-division multiplexing.

One possible way to achieve angle diversity is by adding a lens 1010 on top of the light-emitting surfaces of the SLD devices 200-I, as shown in FIG. 10. The lens may be a plano-concave lens. Other type of lenses may be used. In one embodiment, as illustrated in FIG. 10, a single lens is placed over the entire array 300. However, in a different embodiment, each SLD element 200-I may have its own lens, as suggested by the dash lines 1012, which indicate that a lens stops at that line and another lens starts there. The lens 1010 is configured to change the angle of the vertically emitted light 230 towards another direction according to Snell's law. Because each point on the lens has a unique normal vector, each SLD device 200-I will emit light in a different direction, as indicated by the angles $\theta_I$. Note that the angle $\theta_i$ measures the deviation of the emitted light 230 relative to the direction of the generated light 232. The new direction of the light beam 230-I can be calculated using Snell's law in vector form:

$$n_L(\vec{L}_L \times \vec{n}_S) = n_A(\vec{L}_A \times \vec{n}_S), \tag{3}$$

where $n_L$ and $n_A$ are the refractive indices of the lens 1010 and air, respectively, $L_L$ and $L_A$ are the direction vectors of the light beam before 232 and after 230-I exiting the lens 1010, respectively, and $n_s$ is the normal vector of the concave surface at the point it intersects with the light beam. Decreasing the radius of curvature of the plano-concave lens 1010 increases the divergence of the output light 230-I and can increase the coverage area of the angle-diversity transmitter 1000. Depending on how closely packed the SLDs 200-I are and the directionality of the emitted light beam 230-I from each of them, the light beams from some close SLDs might intersect. In that case, these close SLDs can be grouped into a single transmitter serving the same area in the room 804. If multiple users are occupying the same area, they can still receive independent signals by using time-division multiple access (TDMA) or frequency-division multiplexing (FDM). Thus, the embodiments illustrated in FIGS. 8 and 11 permit offering white light based internet connectivity to plural users and the number of the desired channels of communication can be selected based on the room capacity, by choosing the characteristics of the lens, and/or by selecting the number of SLD devices and their emitted wavelengths.

Figure 11:
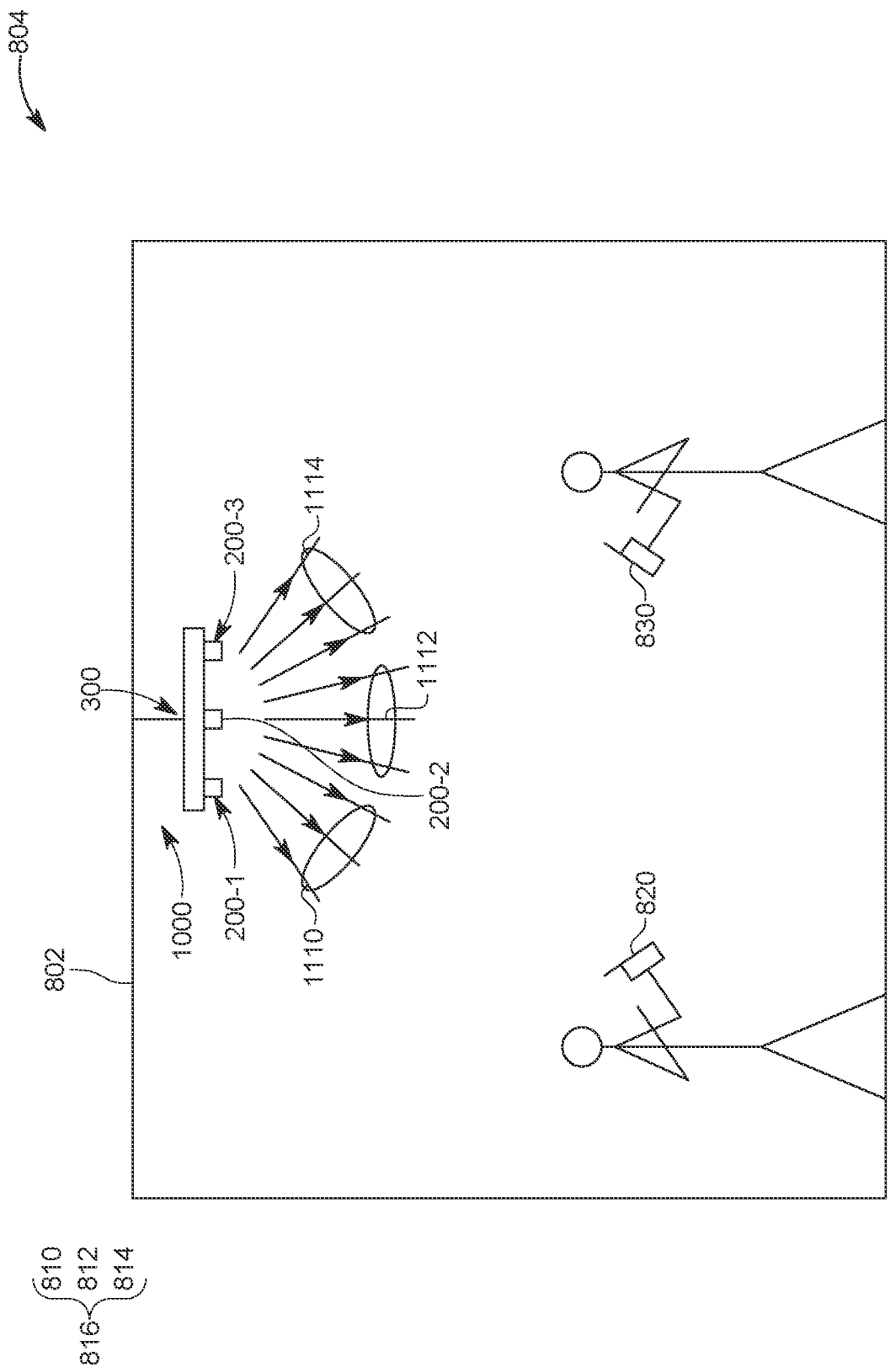
FIG. 11 illustrates another implementation of the array of the SLD devices for illuminating a chamber and also for transmitting information to smart devices placed in the chamber.

Thus, such a transmitter 1000 can send independent signals to different users occupying the room 804 by allocating each user the SLDs pointing towards them, as schematically shown in FIG. 11. Note that the difference between the lighting appliance 800 in FIG. 8 and the lighting appliance 1000 in FIG. 11 is the directionality of the light beams 1110 to 1114. In FIG. 8, there is no directionality of the light beams 810 to 814, while in FIG. 11 the light beams 1110 to 1114 are clearly separated from each other. Based on this observation, the light beams 1110 to 1114 in FIG. 11 do not have to have different wavelengths, i.e., they can use the same wavelength in the visible color spectrum. To compensate for the lack of other colors, some of the SLD devices 200-I can be used to generate other colors so that the total light output from the appliance 1000 is white or close to white for illumination purposes.

Another important advantage of the angle-diversity transmitter 1000 is that it can achieve the functionality of beamforming algorithms since each SLD points at a different direction. Instead of using complex beamforming, this transmitter can scan the entire space it covers by sending a test signal by each SLD device and sequentially to locate the targeted user. After the localization of the users, the data can be transmitted efficiently to the desired user before repeating the quick localization process again after a pre-defined period of time. This design satisfies the requirements for both SDM and user localization, allowing for space-division multiple access (SDMA). The angle-diversity transmitter can be formed in a variety of ways, in addition to the one discussed above with regard to FIG. 10.

Figure 12:
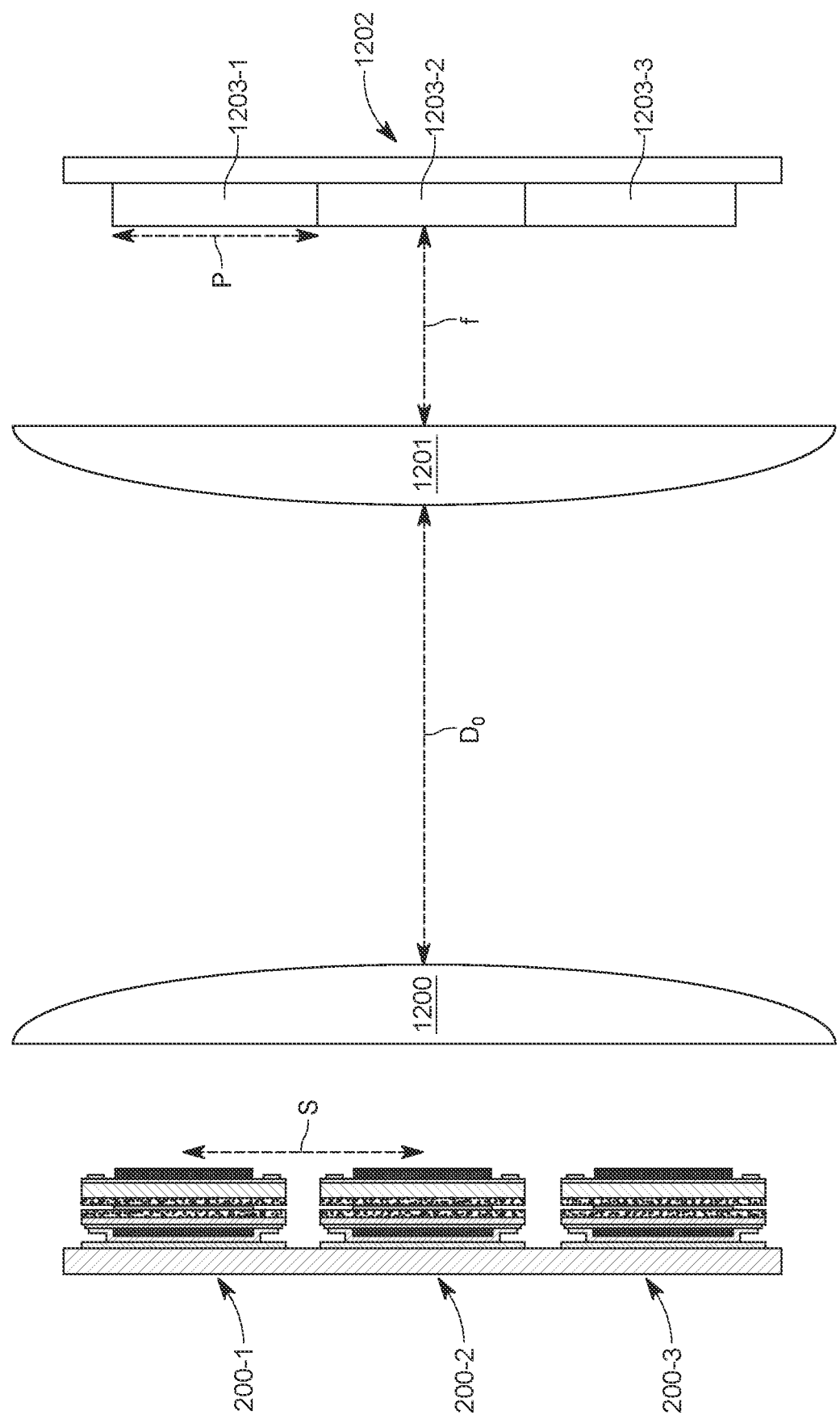
FIG. 12 illustrates still another implementation of the array of the SLD devices.
Figure 13:
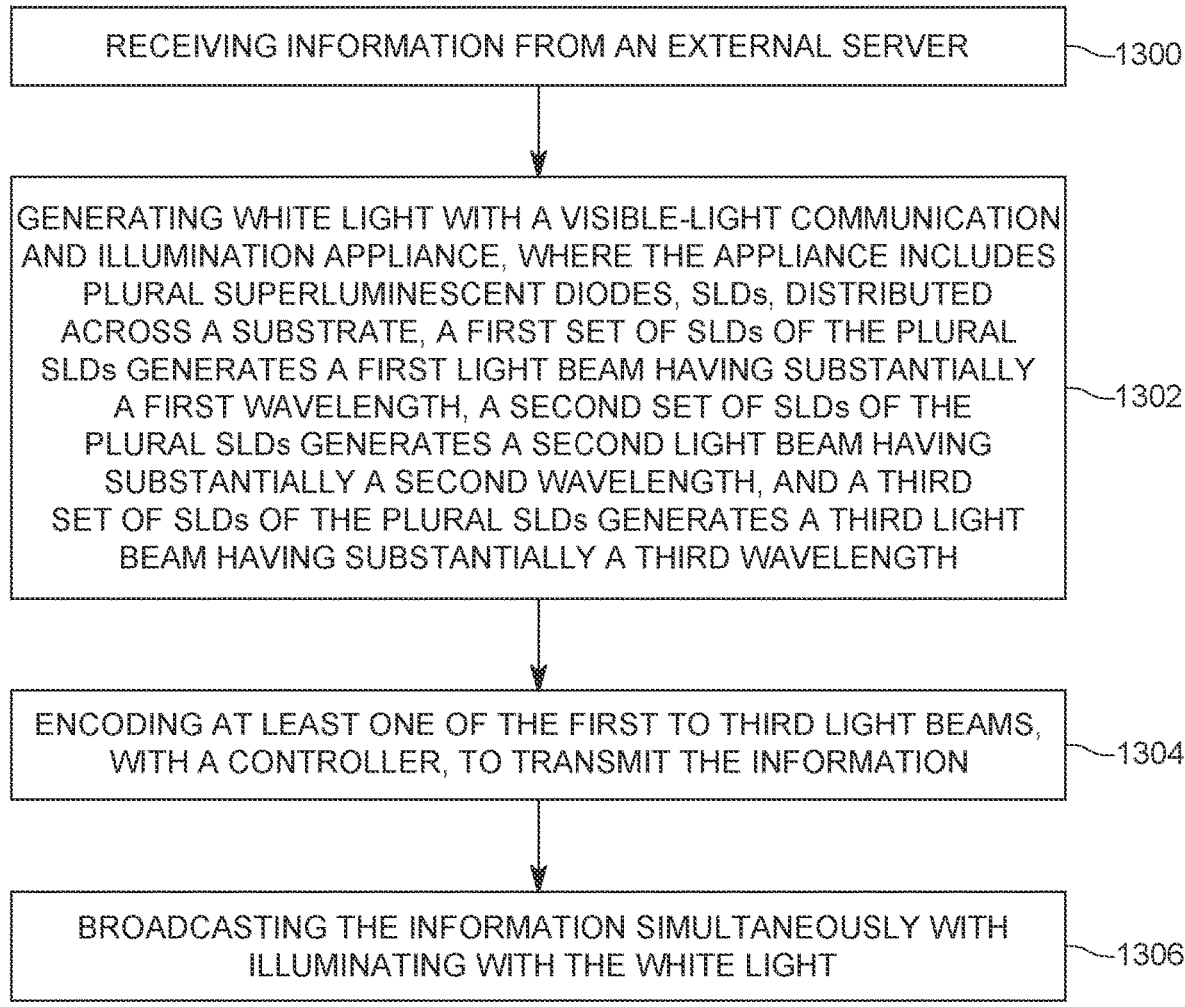
FIG. 13 is a flow chart of a method for simultaneously illuminating a chamber with white light and encoding the white light to transmit information.

In an embodiment, the SDM can also be implemented through imaging multiple-input and multiple-output (MIMO) techniques. In this embodiment, at least one lens 1200 (e.g., plano-convex lens) is used in front of the light-emitting surfaces of the SLD devices 200-I and at least one lens 1201 is used to focus the light on an array 1202 of photodetectors 1203-I, as shown in FIG. 12. In this configuration, each photodetector 1203-I will receive a distinct data stream sent by a single SLD device 200-I or by multiple adjacent SLD devices. To ensure minimal crosstalk, the separation of the adjacent SLD devices 200-I (or the adjacent groups of SLD devices sending a distinct data stream), s, needs to be high enough such that their images do not overlap on the spatial plane of the photodetectors 1203-I. The condition for that is given by:

$$s \geq \frac{D_o P}{f},$$

where $D_o$ is the transmission distance, P is the diameter of a single photodetector 1203-I, and f is the focal length of the lens 1201 in front of the photodetector array 1202. The separation between the adjacent SLD devices 200-I (or the adjacent groups of SLD devices sending a distinct data stream) can be increased during the fabrication process or after fabrication by grouping more SLD devices together to send the same data stream.

The configurations described in this disclosure for fabricating surface-emitting SLDs can be used in a variety of applications. These applications include, but are not limited to, lighting, high-speed OWC, and the design of high-resolution displays. Depending on the application in which they are being deployed, the surface-emitting SLDs can be configured to operate individually, in a group or in an array form, which is made possible by the surface-emitting design.

A method for obtaining visible-light communication and illumination includes a step 1300 of receiving information from an external server, a step 1302 of generating white light with a visible-light communication and illumination appliance, where the visible-light communication and illumination appliance includes plural SLDs distributed across a substrate, where a first set of SLDs of the plural SLDs generate a first light beam having substantially a first wavelength, a second set of SLDs of the plural SLDs generate a second light beam having substantially a second wavelength, and a third set of SLDs of the plural SLDs generate a third light beam having substantially a third wavelength, a step 1304 of encoding at least one of the first to third light beams, with a controller, to transmit the information, and a step 1306 of broadcasting the information simultaneously with illuminating with the white light. A combination of the first light beam, the second light beam and the third light beam produces the white light.

The disclosed embodiments provide a visible-light communication apparatus simultaneously implementing (1) closely-space wavelength-division multiplexing in the visible-light regime and (2) white light illumination. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

REFERENCES

[1] U.S. Pat. No. 5,324,964 A
[2] U.S. Pat. Application No. 2017/0227839 A1
[3] U.S. Pat. No. 6,819,701 B2
[4] U.S. Pat. Application No. 2017/0237234 A1.

What is claimed is:
1. A visible-light communication and illumination array comprising:
a substrate;
plural surface-emitting superluminescent diodes, SLDs, distributed across the substrate, wherein a first set of SLDs of the plural SLDs generates a first light beam having substantially a first wavelength, a second set of SLDs of the plural SLDs generates a second light beam having substantially a second wavelength, and a third set of SLDs of the plural SLDs generates a third light beam having substantially a third wavelength; and
a controller configured to encode at least one of the first light beam, the second light beam and the third light beam to transmit information,
wherein a combination of the first light beam, the second light beam and the third light beam produces white light, and
wherein an SLD of the plural SLDs includes an active layer, which generates light, the active layer is sandwiched between first and second separate confinement heterostructure (SCH) layers, and a length L of the active layer is smaller than a length of each of the first and second SCH layers.

2. The array of claim 1, wherein the first light beam is blue, the second light beam is red, and the third light beam is green.

3. The array of claim 1, wherein each SLD device of the plural SLDs devices generates a same wavelength.

4. The array of claim 3, wherein the wavelength is blue.

5. The array of claim 3, wherein each SLD device of the second and third sets of SLD devices has a corresponding phosphor material for transforming the generated wavelength into an emitted wavelength, which is different from the generated wavelength.

6. The array of claim 5, wherein the SLD devices of the first set of SLD devices has no phosphor material.

7. The array of claim 6, wherein the SLD devices of the second set have a phosphor material that transforms blue light into red light.

8. The array of claim 7, wherein the SLD devices of the third set have a phosphor material that transforms blue light into green light.

9. The array of claim 1, wherein the plural SLD devices are grouped to form light generating units, each light generating unit including only one SLD device from each of the first to third sets, to form a display.

10. The array of claim 1, further comprising:
a lens formed over a surface generating light of each of the plural SLD devices, to change a propagation direction of the first to third light beams relative to a generated light, so that each of the first to third light beams advances along a different direction to achieve spatial division multiplexing.

11. The array of claim 1, wherein a distance D between two adjacent first and second SLD devices of the plural SLDs devices is adjusted to minimize optical crosstalk, such that the distance D is a sum of a first wavelength emitted by the first SLD device and a second wavelength emitted by the second SLD device, or twice the larger wavelength emitted.

12. The array of claim 1, wherein each SLD device includes:
the active layer including at least one pair of quantum wells;
a top distributed Bragg reflector formed on one of the first and second SCH layers; and
a bottom distributed Bragg reflector formed on another one of the first and second SCH layers,
wherein the active layer has lateral current confinement.

13. The array of claim 12, wherein the bottom distributed Bragg reflector includes porous layers.

14. The array of claim 1, further comprising:
a lens placed in front of a surface generating light of each of the plural SLD devices, to collimate the generated light.

15. The array of claim 14, wherein the array is a transmitter in an imaging MIMO system that uses an array of photodetectors to receive information.

16. A surface-emitting superluminescent diode, SLD, configured to generate a blue light, the SLD comprising:
an active layer including at least one pair of quantum wells;
two separate confinement heterostructure (SCH) layers sandwiching the active layer;
a top distributed Bragg reflector formed on one of the two SCH layers; and
a bottom distributed Bragg reflector formed on another one of the two SCH layers,
wherein the active layer, which generates the blue light, has a lateral current confinement by having a length L smaller than a length of each of the two SCH layers.

17. The SLD of claim 16, wherein the bottom distributed Bragg reflector includes porous layers.

18. The SLD of claim 16, further comprising:
a phosphor material formed directly on the top distributed Bragg reflector and configured to change the blue light to green light or red light.

19. The SLD of claim 18, further comprising:
a lens formed over the phosphor material to change a propagation direction of the emitted light.

20. A method for obtaining visible-light communication and illumination, the method comprising:
receiving information from an external server;
generating white light with a visible-light communication and illumination array, wherein the visible-light communication and illumination array includes plural surface-emitting superluminescent diodes, SLDs, distributed across a substrate, wherein a first set of SLDs of the plural SLDs generates a first light beam having substantially a first wavelength, a second set of SLDs of the plural SLDs generates a second light beam having substantially a second wavelength, and a third set of SLDs of the plural SLDs generates a third light beam having substantially a third wavelength;
encoding at least one of the first to third light beams, with a controller, to transmit the information; and
broadcasting the information simultaneously with illuminating with the white light,
wherein a combination of the first light beam, the second light beam and the third light beam produces the white light, and
wherein an SLD of the plural SLDs includes an active layer, which generates light, the active layer is sandwiched between first and second separate confinement heterostructure (SCH) layers, and a length L of the active layer is smaller than a length of each of the first and second SCH layers.

* * * * *